(12) United States Patent
Tang et al.

(10) Patent No.: US 11,967,112 B2
(45) Date of Patent: Apr. 23, 2024

(54) METHOD AND APPARATUS FOR DETECTING CALIBRATION REQUIREMENT FOR IMAGE SENSORS IN VEHICLES

(71) Applicant: AitronX Inc., Saratoga, CA (US)

(72) Inventors: Xinlu Tang, Saratoga, CA (US); Chi Yan, Saratoga, CA (US); Jiangwei Li, Saratoga, CA (US); Jie Lin, Saratoga, CA (US)

(73) Assignee: AitronX Inc., Saratoga, CA (US)

( * ) Notice: Subject to any disclaimer, the term of this patent is extended or adjusted under 35 U.S.C. 154(b) by 0 days.

(21) Appl. No.: 17/939,701

(22) Filed: Sep. 7, 2022

(65) Prior Publication Data

US 2024/0078706 A1 Mar. 7, 2024

(51) Int. Cl.
*G06T 7/80* (2017.01)
*G06T 7/20* (2017.01)
*G06V 20/56* (2022.01)

(52) U.S. Cl.
CPC .......... *G06T 7/80* (2017.01); *G06T 7/20* (2013.01); *G06V 20/588* (2022.01); *G06T 2207/30256* (2013.01)

(58) Field of Classification Search
None
See application file for complete search history.

(56) References Cited

U.S. PATENT DOCUMENTS

| | | | | |
|---|---|---|---|---|
| 11,589,017 B1 * | 2/2023 | Chang | ................. | H04N 23/55 |
| 11,747,822 B2 * | 9/2023 | Heinla | ................. | G05D 1/0251 |
| | | | | 701/28 |
| 2013/0169822 A1 * | 7/2013 | Zhu | ................. | G06T 7/80 |
| | | | | 348/180 |
| 2016/0267657 A1 * | 9/2016 | Gupta | ................. | H04N 17/00 |
| 2018/0165833 A1 * | 6/2018 | Inoue | ................. | H04N 17/002 |
| 2018/0253108 A1 * | 9/2018 | Heinla | ................. | G06T 7/73 |
| 2018/0324415 A1 * | 11/2018 | Bovyrin | ................. | H04N 17/002 |
| 2018/0365859 A1 * | 12/2018 | Oba | ................. | H04N 23/90 |
| 2020/0134869 A1 * | 4/2020 | Bamber | ................. | G06T 7/97 |
| 2020/0193641 A1 * | 6/2020 | Markkassery | ................. | G06T 7/73 |

(Continued)

OTHER PUBLICATIONS

Howard, Andrew G., et al. "Mobilenets: Efficient convolutional neural networks for mobile vision applications." arXiv preprint arXiv:1704.04861 (2017).

(Continued)

*Primary Examiner* — Ricky Chin

(74) *Attorney, Agent, or Firm* — Young Basile Hanlon & MacFarlane, P.C.

(57) ABSTRACT

Described is a method for detecting a calibration requirement for image sensors in a vehicle. The method includes detecting a ground pattern in a generated image associated with a surrounding of a vehicle. The method includes extracting at least one key point associated with the detected ground pattern, from the generated image. The method includes determining a relative motion parameter associated with the extracted at least one key point based on tracking of the extracted at least one key point over a period of time. The method further includes detecting the calibration requirement for the image sensor based on the determined relative motion parameter and generating an output signal based on the detected calibration requirement.

20 Claims, 13 Drawing Sheets

(56) References Cited

U.S. PATENT DOCUMENTS

| | | | |
|---|---|---|---|
| 2020/0209369 A1* | 7/2020 | Koch | G01S 7/4972 |
| 2020/0282929 A1* | 9/2020 | Kroeger | G01S 7/497 |
| 2021/0096215 A1* | 4/2021 | Slobodyanyuk | H04W 4/38 |
| 2021/0241492 A1* | 8/2021 | Hsu | G06T 7/13 |
| 2022/0254064 A1* | 8/2022 | Tang | G06T 7/80 |
| 2022/0284226 A1* | 9/2022 | Lev | G06V 20/588 |
| 2023/0032613 A1* | 2/2023 | Duan | G06T 7/80 |
| 2023/0177724 A1* | 6/2023 | Naveh | G06T 7/80 |
| | | | 382/103 |

OTHER PUBLICATIONS

Sandler, Mark, et al. "Mobilenetv2: Inverted residuals and linear bottlenecks." Proceedings of the IEEE conference on computer vision and pattern recognition. 2018.

Xu, Jing, et al. "RegNet: Self-regulated network for image classification." arXiv preprint arXiv:2101.00590 (2021).

Liu, Wei, et al. "Ssd: Single shot multibox detector." European conference on computer vision. Springer, Cham, 2016.

Tan, Mingxiing, Ruoming Pang, and Quoc V. Le. "Efficientdet: Scalable and efficient object detection." Proceedings of the IEEE/CVF conference on computer vision and pattern recognition. 2020.

Cao, Zhe, et al. "Realtime multi-person 2d pose estimation using part affinity fields." Proceedings of the IEEE conference on computer vision and pattern recognition. 2017.

Xiao, Bin, Haiping Wu, and Yichen Wei. "Simple baselines for human pose estimation and tracking." Proceedings of the European conference on computer vision (ECCV). 2018.

Redmon, Joseph, and Ali Farhadi. "Yolov3: An incremental improvement." arXiv preprint arXiv:1804.02767 (2018).

Bochkovskiy, Alexey, Chien-Yao Wang, and Hong-Yuan Mark Liao. "Yolov4: Optimal speed and accuracy of object detection." arXiv preprint arXiv:2004.10934 (2020).

* cited by examiner ary Vision systems are evolving in several areas including the use of image-based sensors in vehicles. These vision systems utilize the image-based sensors to generate a real-time image capturing the vehicle's surrounding. This allows the driver to better perceive the vehicle's surrounding, especially in crowded area or narrow space. Conventionally, the image-based sensors are calibrated on an assembly line for the vehicles. However, during daily use, vehicle conditions may be different from those on the assembly line. For example, the load may be different, the tire pressure may change, the tire may have some wear and tear, or the image-based sensors may need to be re-installed or adjusted after accidents. Due to such vehicle conditions, the calibration of the image-based sensors on the assembly line may prove to be inaccurate for the vehicle in daily use. Therefore, the inaccurately calibrated image-based sensors affect the quality of the surrounding view images. The deformations in the surrounding view images could distract driver's attention, and even inadvertently affect the driver's ability to make correct driving decisions.

METHOD AND APPARATUS FOR DETECTING CALIBRATION REQUIREMENT FOR IMAGE SENSORS IN VEHICLES

CROSS-REFERENCE TO RELATED APPLICATION(S)

None

TECHNICAL FIELD

This disclosure relates to vision systems for vehicles, and more particularly, to a calibration requirement of the vision systems in the vehicles for providing safe navigation.

BACKGROUND

Vision systems are evolving in several areas including the use of image-based sensors in vehicles. These vision systems utilize the image-based sensors to generate a real-time image capturing the vehicle's surrounding. This allows the driver to better perceive the vehicle's surrounding, especially in crowded area or narrow space. Conventionally, the image-based sensors are calibrated on an assembly line for the vehicles. However, during daily use, vehicle conditions may be different from those on the assembly line. For example, the load may be different, the tire pressure may change, the tire may have some wear and tear, or the image-based sensors may need to be re-installed or adjusted after accidents. Due to such vehicle conditions, the calibration of the image-based sensors on the assembly line may prove to be inaccurate for the vehicle in daily use. Therefore, the inaccurately calibrated image-based sensors affect the quality of the surrounding view images. The deformations in the surrounding view images could distract driver's attention, and even inadvertently affect the driver's ability to make correct driving decisions.

In light of the above stated disadvantages, there is a need for generating accurate surrounding view images using the various image-based sensors installed in the vehicles.

SUMMARY

Disclosed herein are implementations of an apparatus, a method and a computer programmable product are provided for detecting a calibration requirement for image sensors in a vehicle for providing safe driving solutions.

In one aspect, a method for detecting a calibration requirement for at least one image sensor is disclosed. The method includes detecting a ground pattern in a generated image associated with a surrounding of a vehicle. The method includes extracting at least one key point associated with the detected ground pattern, from the generated image. The method includes determining a relative motion parameter associated with the extracted at least one key point based on tracking of the extracted at least one key point over a period of time. The method further includes detecting the calibration requirement for the image sensor based on the determined relative motion parameter and generating an output signal based on the detected calibration requirement.

In some implementations, the detecting of the calibration requirement for the at least one image sensor based on the determined relative motion parameter further comprises detecting the calibration requirement as a positive calibration requirement indicative of a need for calibrating one or more installation parameters of the at least one image sensor when the relative motion parameter indicates a non-straight line or a line non-parallel to the vehicle's body; and detecting the calibration requirement as a negative calibration requirement indicative of no need for calibrating the one or more installation parameters of the at least one image sensor when the relative motion parameter indicates at least one of a straight line or a parallel line to w.r.t the vehicle's body.

In some implementations, the method includes generating the output signal to trigger a re-calibration algorithm when the positive calibration requirement is detected.

In some implementations, the generated image is associated with a raw image captured using the at least one image sensor.

In some implementations, the ground pattern is associated with at least one of: a road object marking, a lane marking, a boundary marking, a road sign, and a traffic marking.

In some implementations, the extracted key point comprises at least one of: a corner of the ground pattern or a tip of the ground pattern.

In some implementations, the method includes estimating a vehicle motion parameter based on data obtained from one or more vehicle motion sensors. In addition, the method includes generating the output signal to perform calibration of the at least one image sensor's installation parameters based on the estimated vehicle motion parameter.

In some implementations, the one or more vehicle motion sensors comprise at least one of: a steering angle sensor, a wheel speed sensor, and an inertial measurement unit.

In some implementations, the vehicle motion parameter comprises at least a vehicle speed parameter.

In some implementations, determining the relative motion parameter associated with the extracted at least one key point comprises detecting a first location of the at least one key point at a first-time instance in the period of time. In addition, determining the relative motion parameter associated with the extracted at least one key point comprises detecting a second location of the at least one key point at a second time instance in the period of time. Further, determining the relative motion parameter associated with the extracted at least one key point comprises generating a line extending between the first location and the second location. Furthermore, determining the relative motion parameter associated with the extracted at least one key point comprises determining the relative motion parameter associated with the extracted at least one key point based on an orientation of the generated line with respect to the vehicle's body.

In another aspect, an apparatus of detecting a calibration requirement for at least one image sensor is disclosed. The apparatus includes a memory configured to store compute-executable instructions. The apparatus further includes at least one processor configured to execute the computer-executable instructions. The processor is configured to detect a ground pattern in a generated image associated with a surrounding view of a vehicle. In addition, the processor is configured to extract at least one key point associated with the detected ground pattern, from the generated image. The processor is further configured to determine a relative motion parameter associated with the extracted at least one key point based on tracking of the extracted at least one key point over a period of time. In addition, the processor is configured to detect calibration requirement for the at least one image sensor based on the determined relative motion parameter. The processor is further configured to generate an output signal based on the detected calibration requirement.

In yet another aspect, a computer program product is disclosed. The computer program product includes a non-transitory computer-readable medium having stored thereon computer-executable instructions which when executed by at least one processor, cause the at least one processor to conduct operations for detecting a calibration requirement for at least one image sensor. The operations include detecting a ground pattern in a generated image associated with a surrounding view of a vehicle. The operations include extracting at least one key point associated with the detected ground pattern, from the generated image. In addition, the operations include determining a relative motion parameter associated with the extracted at least one key point based on tracking of the extracted at least one key point over a period of time. Further, the operations include detecting calibration requirement for the at least one image sensor based on determined relative motion parameter. Furthermore, the operations include generating an output signal based on the detected calibration requirement.

BRIEF DESCRIPTION OF THE DRAWINGS

The disclosure is best understood from the following detailed description when read in conjunction with the accompanying drawings. It is emphasized that, according to common practice, the various features of the drawings are not to-scale. On the contrary, the dimensions of the various features are arbitrarily expanded or reduced for clarity.

DETAILED DESCRIPTION

Figure 1:
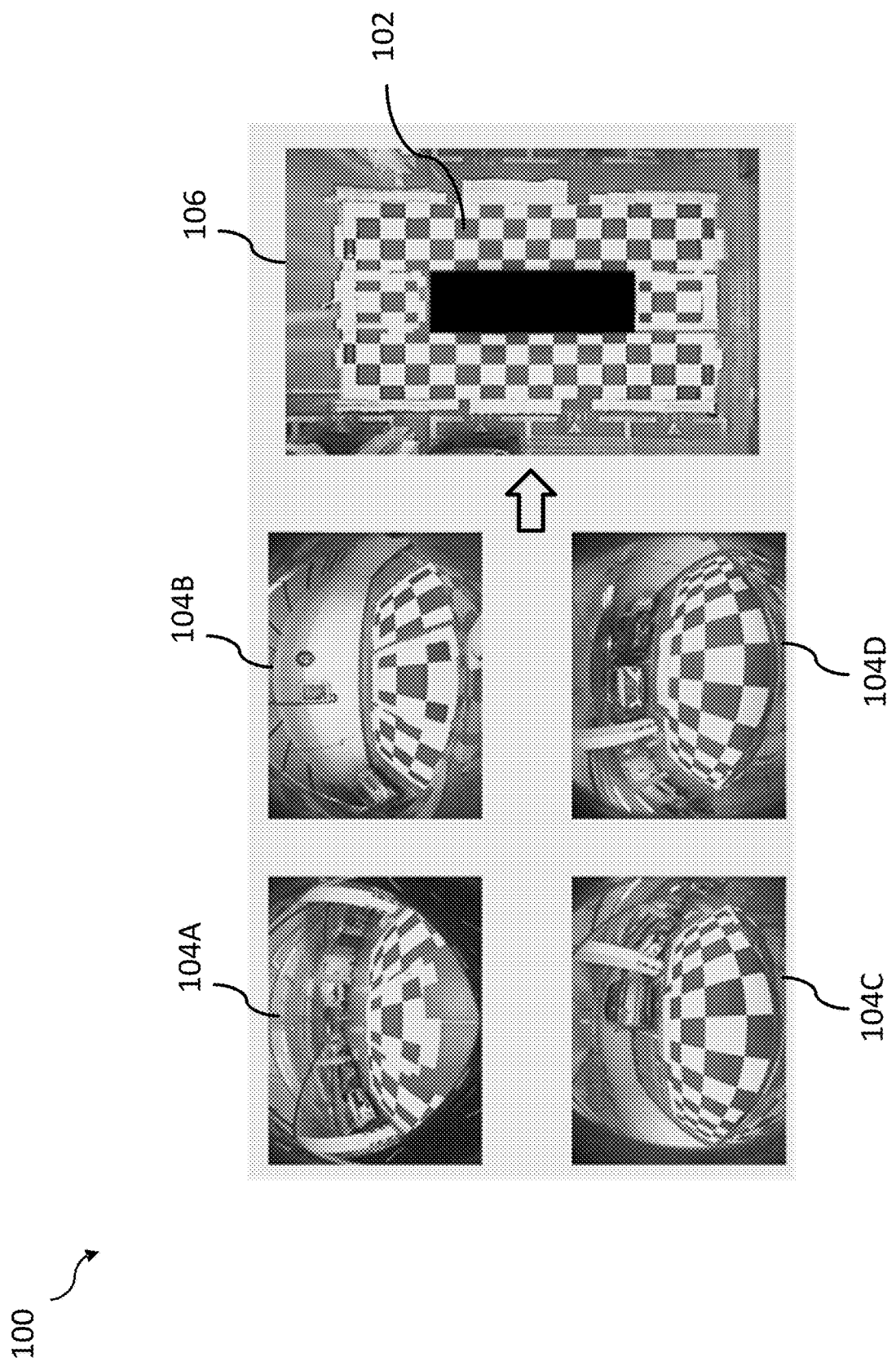
FIG. 1 is an example illustration showing a checkerboard pattern utilized to calibrate sensors of a vehicle on an assembly line.

While the disclosure has been described in connection with certain implementations, it is to be understood that the disclosure is not to be limited to the disclosed implementations but, on the contrary, is intended to cover various modifications and equivalent arrangements included within the scope of the appended claims, which scope is to be accorded the broadest interpretation so as to encompass all such modifications and equivalent structures as is permitted under the law.

The present disclosure discloses a method and an apparatus for automatically detecting misalignments of image sensors installed in a vehicle to provide safe driving. In addition, the method and the apparatus are configured to detect calibration requirement for the image sensors based on detection of misalignments of image sensors.

Conventional systems for calibration of image sensors may include calibration of the image sensors on an assembly line for the vehicle itself. Such calibration systems may utilize installed calibration patterns placed on the ground near the assembly line. For example, the calibration patterns utilized by the conventional systems may include a checkerboard pattern, a symmetric circles grid pattern, an asymmetric circles grid pattern and so forth. Such patterns may be fixed, and the calibration may only be performed on the assembly line for the vehicle. However, when the vehicles are on road, vehicle conditions could be different from those on the assembly line. For example, a different amount of load on the vehicles, a different tire pressure, and the like. Therefore, such calibration of the image sensors of the vehicle on the assembly line proves to be inaccurate during real-time when the vehicle conditions are different from those on the assembly line.

To overcome the above-mentioned problems faced in the conventional systems, an apparatus of the present disclosure enables calibration of the image sensors based on the real-time vehicle conditions and available ground patterns in a surrounding environment of the vehicle. The apparatus of the present disclosure utilizes the ground patterns in the surrounding environment to detect calibration requirement for the image sensors. In an implementation, the ground patterns in the surrounding environment utilized by the vehicle may include one or more corners (or key points). The apparatus may utilize the key points and a relative motion of the vehicle with respect to a body of the vehicle to detect a calibration requirement for the image sensor of the vehicles. Thus, the apparatus of the present disclosure enables automatic detection of misalignments and the detection of the calibration requirement of the image sensors to overcome the disadvantages, such as inaccurate calibration of the image sensors of the conventional systems to provide an accurate calibration of the image sensors of the vehicles. The method and the apparatus are further described in detail below in connection with FIG. 3-13 after a brief introduction.

FIG. 1 is an example illustration 100 showing a checkerboard pattern 102 utilized to calibrate sensors of a vehicle on an assembly line. In conventional systems, the sensors of the vehicle are calibrated on the assembly line. The checkerboard pattern 102 may be installed near the ground, such as floor of the assembly line. The vehicle may include multiple cameras or sensors installed at different positions on the vehicle. For example, the multiple sensors may include a front view camera, a rear view camera, a left view camera, or a right view camera. In an implementation, the multiple sensors may be fisheye cameras that may capture fisheye images corresponding to surrounding views of the vehicle.

In an exemplar scenario, a first image 104A may be captured by the front view camera, a second image 104B may be captured by the rear view camera, a third image 104C may be captured by the left view camera and a fourth image 104D may be captured by the right view camera of the vehicle.

Conventionally, a surrounding view image 106 with a bird's eye view may be generated based on the captured fisheye images, such as the first image 104A, the second image 104B, the third image 104C and the fourth image 104D. The surrounding view image 106 may include the checkerboard pattern 102 that may be used to calibrate the cameras, such as the front view camera, the rear view camera, the left view camera, or the right view camera of the vehicle on the assembly line.

But such calibration of the image sensors of the vehicle on the assembly line is prone to be inaccurate during real-time when the vehicle conditions are different from those on the assembly line.

Figure 2:
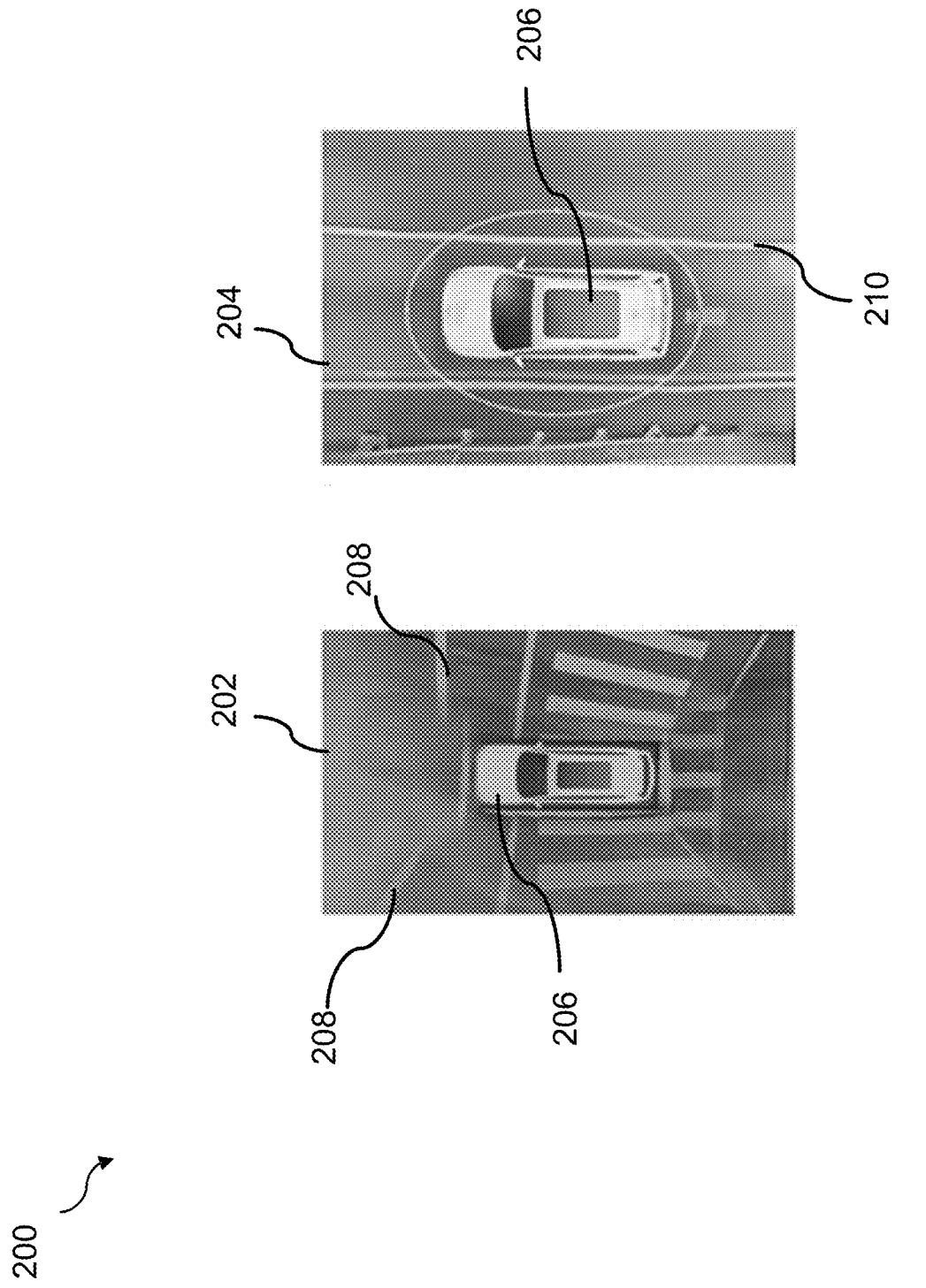
FIG. 2 is an example illustration of misaligned surrounding view images of the vehicle.

The inaccurately calibrated sensors may lead to generation of a misaligned surrounding view image, such as shown in FIG. 2.

FIG. 2 is an example illustration 200 of the misaligned surrounding view images of the vehicle shown in FIG. 1. The example illustration 200 depicts a first surrounding view image 202 and a second surrounding view image 204.

The first surrounding view image 202 depicts a vehicle 206 on a road. The first surrounding view image 202 further depicts a zebra crossing line 208 that is misaligned. The accurately calibrated cameras may depict the zebra crossing line 208 as a straight line, however, due to the inaccurately calibrated cameras, the zebra crossing line 208 may be broken in the first surrounding view image 202.

Similarly, the second surrounding view image 204 depicts the vehicle 206. The second surrounding view image 204 further depicts a lane line 210 that is non-parallel with respect to the vehicle 206 even when the vehicle 206 is travelling parallel to the lane line 210. Such non-parallel lane line indicates misalignments in the surrounding view images that need to be rectified. The misalignments and distortions in the surrounding view images may be rectified when the sensors of the vehicle 206 are accurately calibrated. As opposed to the conventional systems, the apparatus of the present disclosure enables calibration of the sensors of the vehicle 206 such that the surrounding view images are distortion less. Details of the detection of the calibration requirement of the sensors of the vehicle 206 are further described, for example, in conjunction with description of FIG. 3 to FIG. 13 outlined below.

Figure 3:
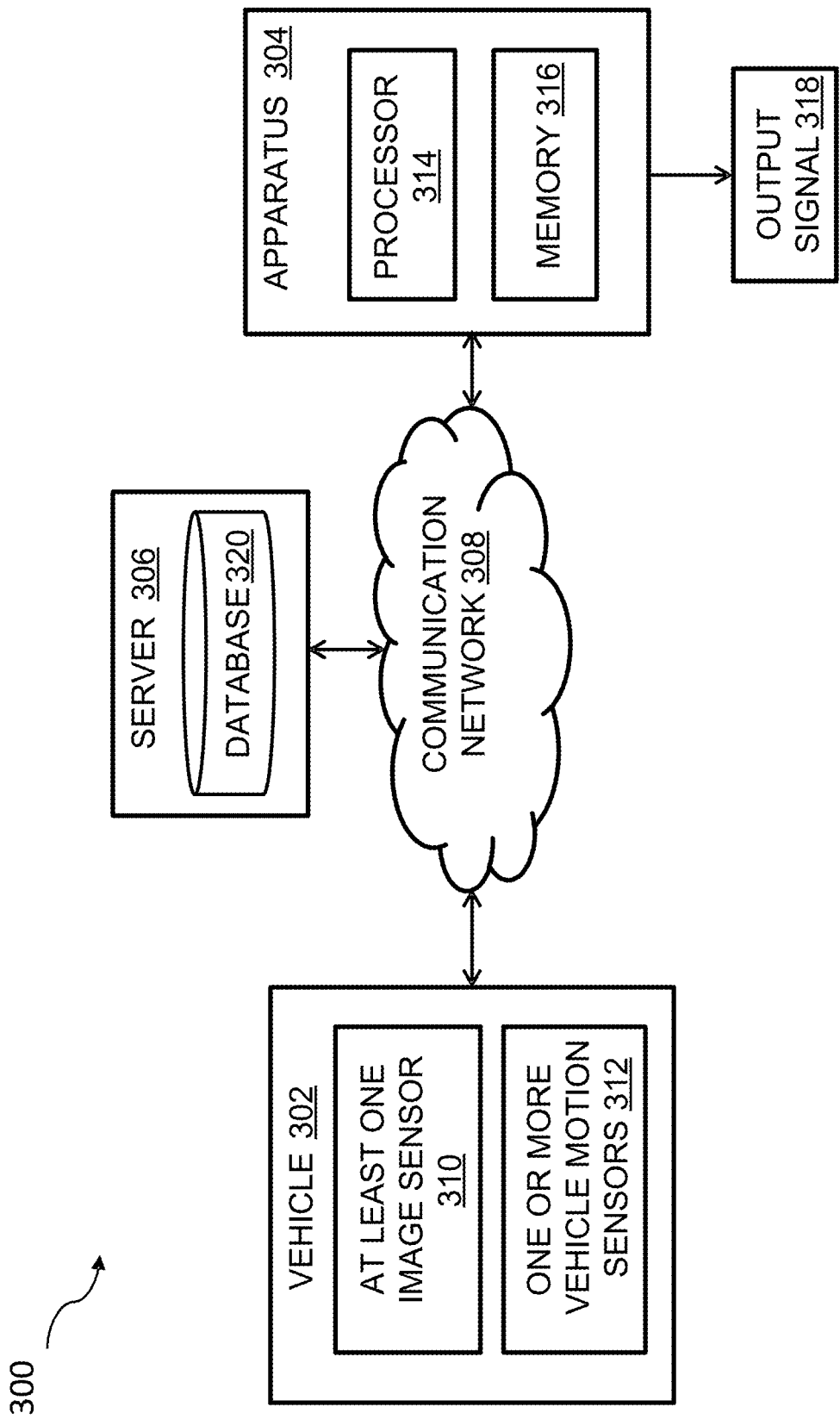
FIG. 3 is a block diagram of an example system for detecting a calibration requirement for at least one image sensor in a vehicle, in accordance with an implementation of the present disclosure.

FIG. 3 is a block diagram of an example system 300 for detecting a calibration requirement for a sensor, such as at least one image sensor 310 in a vehicle 302, in accordance with an implementation of the present disclosure. The system 300 includes the vehicle 302, an apparatus 304, a server 306 and a communication network 308. The vehicle 302 may be equivalent in operation to the vehicle 206 described previously in conjunction with FIG. 2.

The vehicle 302 may correspond to at least one of autonomous vehicle, manual driven vehicle, or semi-autonomous vehicle. The vehicle 302 may include but may not be limited to a four-wheeler, and a two-wheeler. The vehicle 302 is equipped with at least one image sensor 310. The at least one image sensor 310 may be installed in the vehicle 302. The at least one image sensor 310 may be positioned at one or more locations on the vehicle 302, for example, towards a front end of the vehicle 302, a rear end of the vehicle 302, a left end of the vehicle 302, or a right end of the vehicle 302.

The at least one image sensor 310 may be configured to capture one or more raw images of surrounding view of the vehicle 302. For example, a field-of-view of the at least one image sensor 310 may be such that the at least one image sensor 310 is able to capture the surrounding view, including a surrounding ground of the vehicle 302 in the captured one or more raw images. In an implementation, the at least one image sensor 310 may be associated with a camera such as a rear-view camera, a front view camera, a left view camera, a right view camera, a digital video recorder, a driving recorder, or an event data recorder. To that end, the at least one image sensor 310 may correspond to a fish-eye camera.

The vehicle 302 is further equipped with one or more vehicle motion sensors 312. The one or more vehicle motion sensors 312 may be installed in the vehicle 302. The one or more vehicle motion sensors 312 may be configured to estimate motion parameters associated with the vehicle 302 when the vehicle 302 is in motion. For example, the motion parameters may be associated with a straight motion of the vehicle 302 on a road and a speed of the vehicle 302. The one or more vehicle motion sensors 312 includes but may not be limited to, a steering angle sensor, a wheel speed sensor, or an inertial measurement unit (IMU). The steering angle sensor may be utilized to determine the straight motion of the vehicle 302 on the road. The wheel speed sensor may be utilized to determine the speed of the vehicle 302 based on rotations per minute (rpm) of the wheels of the vehicle 302. The IMU may be utilized to determine the speed, turn rate, heading, inclination and acceleration of the vehicle 302.

Furthermore, the apparatus 304 of the system 300 may include a processor 314 and a memory 316. The memory 316 is configured to store computer-readable instructions. The processor 314 is configured to execute the computer-readable instructions stored in the memory 316 to perform detection of the calibration requirement for the at least one image sensor 310 in the vehicle 302. Thus, the apparatus 304 may be configured to utilize the processor 314 to perform one or more steps for the detection of the calibration requirement for the at least one image sensor 310. The detection of the calibration requirement may refer to identification of a need of calibration of the at least one image sensor 310 of the vehicle 302. In an implementation, the calibration requirement may be a positive calibration requirement indicative of a need for calibrating one or more installation parameters of the at least one image sensor 310. In another implementation, the calibration requirement may be a negative calibration requirement indicative of no need for calibrating the one or more installation parameters of the at least one image sensor 310.

The apparatus 304 may be configured to perform the one or more steps, such as detection of the calibration requirement for the at least one image sensor 310 and generate an output signal 318 based on the detected positive calibration requirement for the at least one image sensor 310. In some implementations, the apparatus 304 may be onboard the vehicle 302. Examples of the apparatus 304 include but may not be limited to, a navigation system installed in the vehicle 302, an advanced driver assistance system (ADAS), a personal navigation device (PND), a portable navigation device, an infotainment system and/or other device integrated with the vehicle 302. Details of the processor 314 and the memory 316 are provided further, for example, in FIG. 12.

In operation, the apparatus 304 may detect a movement of the vehicle 302. For example, the vehicle 302 may be driven on a road. Based on the determination that the motion of the vehicle 302 is straight, the at least one image sensor 310 may capture one or more raw images of the surrounding of the vehicle 302. For example, the one or more raw images may include fisheye views of the surrounding of the vehicle 302. The apparatus 304 may generate an image associated with the surrounding of the vehicle 302, based on the captured one or more raw images. The generated image corresponds to an image with 360 degree surrounding view of the vehicle 302. The apparatus 304 may detect a ground pattern in the generated image associated with the surrounding of the vehicle 302. Details of the detection of the ground pattern are further provided, for example, in the descriptions below in connection with FIG. 4 and FIG. 5.

The apparatus 304 may further be configured to extract at least one key point associated with the detected ground pattern, from the generated image. The extracted key point may include at least one of a corner of the ground pattern, or a tip of the ground pattern. For example, the detected ground pattern may include an arrow depicted on the road on which the vehicle 302 may be travelling. The extracted key point may be a tip of the arrow depicted on the road. Details of the extraction of the key points are further provided, for example, in FIGS. 4 and 5.

The apparatus 304 may further be configured to determine a relative motion parameter associated with the extracted at least one key point based on tracking of the extracted at least one key point over a period of time. For example, a location of the at least one key point is tracked at different time instances in the period of time. The location of the at least one key point at the different time instances may be determined from the generated images associated with the surrounding of the vehicle 302. Details of the determination of the relative motion parameter are further provided, for example, in descriptions below in connection with FIG. 4 and FIG. 6.

The apparatus 304 may further be configured to detect the calibration requirement for the at least one image sensor 310 based on the determined relative motion parameter. In an implementation, the detected calibration requirement may be at least one of a positive calibration requirement or a negative calibration requirement. Details of the detection of the calibration requirement for the at least one image sensor 310 are further provided, for example, in connection with FIG. 4, and FIG. 7A and FIG. 7B.

The apparatus 304 may further generate the output signal 318 based on the detected calibration requirement. In one or more implementations, the output signal 318 may trigger a re-calibration algorithm when the positive calibration requirement is detected by the apparatus 304. In some implementations, the re-calibration algorithm can be performed at, for example, step 822 of FIG. 8, after step 410 of FIG. 4 or as part of the process described in connection with FIG. 9. Details of the generation of the output signal 318 are further provided, for example, in descriptions below in connection with FIG. 4, FIG. 8, FIG. 9, FIG. 10 and FIG. 11.

Figure 4:
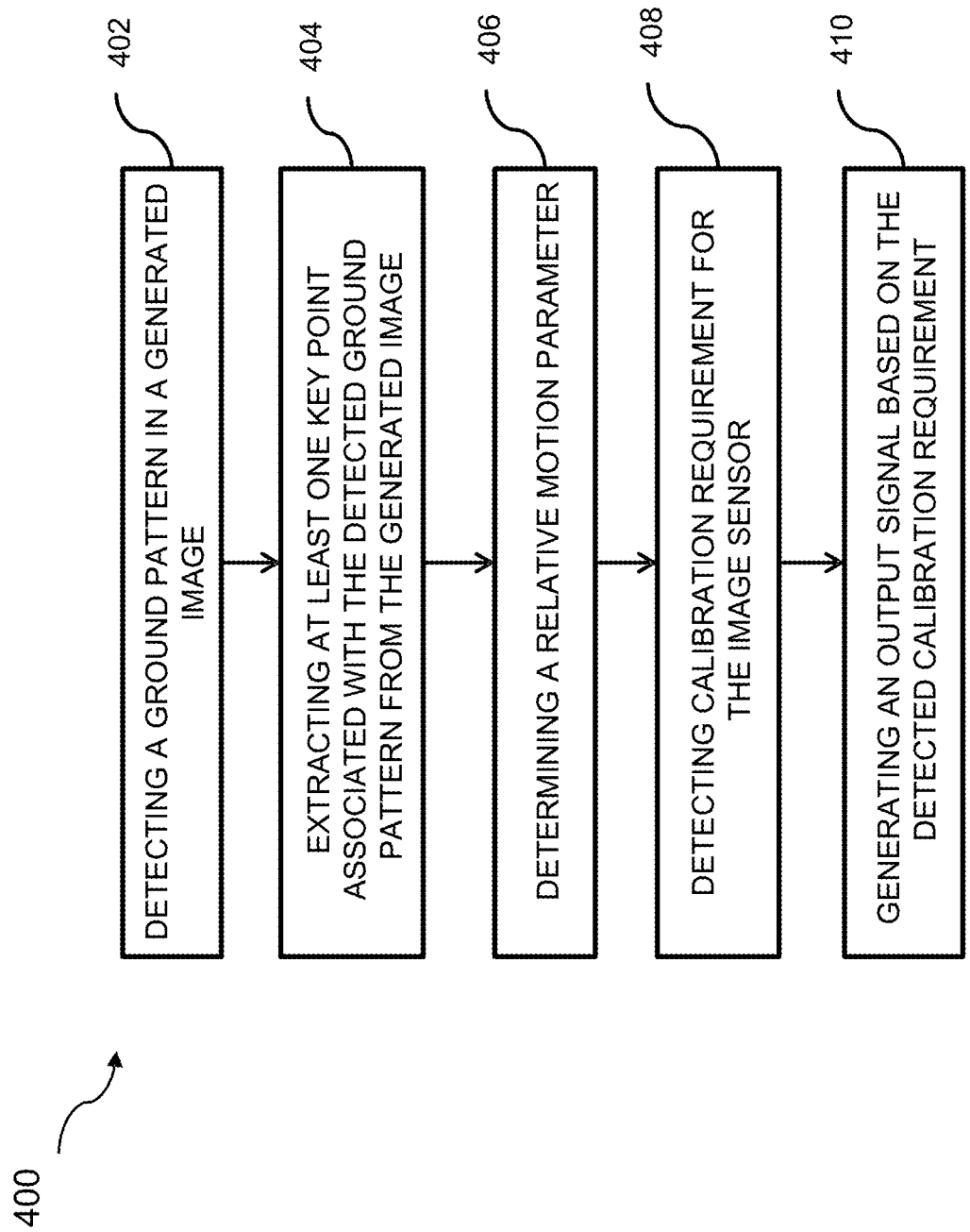
FIG. 4 is an example flow diagram depicting an example method for detecting the calibration requirement for the at least one image sensor in the vehicle, in accordance with an implementation of the present disclosure.

FIG. 4 is a flowchart depicting an example method 400 for detecting the calibration requirement for the at least one image sensor 310 in the vehicle 302, in accordance with an implementation of the present disclosure. FIG. 4 is explained in conjunction with elements of FIG. 3. It will be understood that each block of the flowchart of the method 400 may be implemented by various means, such as hardware, firmware, processor, circuitry, and/or other communication devices associated with execution of software including one or more computer program instructions. For example, one or more of the procedures described above may be embodied by computer program instructions. In this regard, the computer program instructions which embody the procedures described above may be stored in the memory 316 of the system 300, employing an implementation of the present disclosure and executed by the processor 314. As will be appreciated, any such computer program instructions may be loaded onto a computer or other programmable apparatus (for example, hardware) to produce a machine, such that the resulting computer or other programmable apparatus implements the functions specified in the flow diagram blocks. These computer program instructions may also be stored in a computer-readable memory that may direct a computer or other programmable apparatus to function in a particular manner, such that the instructions stored in the computer-readable memory produce an article of manufacture the execution of which implements the function specified in the flowchart blocks. The computer program instructions may also be loaded onto a computer or other programmable apparatus to cause a series of operations to be performed on the computer or other programmable apparatus to produce a computer-implemented process such that the instructions which execute on the computer or other programmable apparatus provide operations for implementing the functions specified in the flow diagram blocks.

Accordingly, blocks of the flow diagram support combinations of means for performing the specified functions and combinations of operations for performing the specified functions for performing the specified functions. It will also be understood that one or more blocks of the flow diagram, and combinations of blocks in the flow diagram, may be implemented by special purpose hardware-based computer systems which perform the specified functions, or combinations of special purpose hardware and computer instructions. The method 400 illustrated by the flowchart diagram of FIG. 4 is configured for detecting the calibration requirement for the at least one image sensor 310 in the vehicle 302. Fewer, more, or different steps may be provided.

The method 400 may include, at a step 402, detecting a ground pattern in a generated image associated with surrounding view of the vehicle 302. The image associated with surrounding view of the vehicle 302 may be generated by use of one or more raw images captured by the at least one image sensor 310. The apparatus 304 may be configured to receive a set of images associated with surrounding views of the vehicle 302 from the at least one image sensor 310 in the vehicle 302. The one or more raw images captured by the at least one image sensor 310 are utilized to generate the image associated with surrounding view of the vehicle 302. In an example, the set of images may include a first image, a second image, a third image and a fourth image. The first image, the second image, the third image and the fourth image may be the raw images captured by the at least one image sensor 310.

In an example scenario, the first image may be obtained from a front view camera of the at least one image sensor 310 of the vehicle 302. In one implementation, the front view camera may be configured to capture a fisheye surrounding front view of the vehicle 302. In addition, the second image may be obtained from a rear view camera of the at least one image sensor 310 of the vehicle 302. In one implementation, the rear view camera may be configured to capture a fisheye surrounding rear view of the vehicle 302. The third image may be obtained from a left view camera of the at least one image sensor 310 of the vehicle 302. In one implementation, the left view camera may be configured to capture a fisheye surrounding left view of the vehicle 302. The fourth image may be obtained from a right view camera of the vehicle 302. The right view camera may be configured to capture a fisheye surrounding right view of the vehicle 302.

The obtained fisheye images, such as the first image, the second image, the third image and the fourth image may include at least a portion of a ground (such as the road) surrounding the vehicle 302. The obtained fisheye images may further possess large distortions (e.g., similar to the fisheye views shown in FIG. 1). Such distortions may require to be corrected to generate the image associated with the surrounding view of the vehicle 302.

In an implementation, the one or more raw images (such as the fisheye views) may be virtually transformed to generate the bird's eye views. The bird's eye views may be stitched together to generate the image associated with the surrounding of the vehicle 302. The generated image may include the bird's eye view (such as from top) of the surrounding of the vehicle 302. In another implementation, the captured one or more raw images may be compressed to generate the image associated with the surrounding of the vehicle 302. Such compressed images may enable utilization of less computational resources by the apparatus 304 for generation of the image associated with the surrounding of the vehicle 302. Example of the generated image associated with surrounding view of the vehicle 302 is further depicted in FIG. 5.

Figure 5:
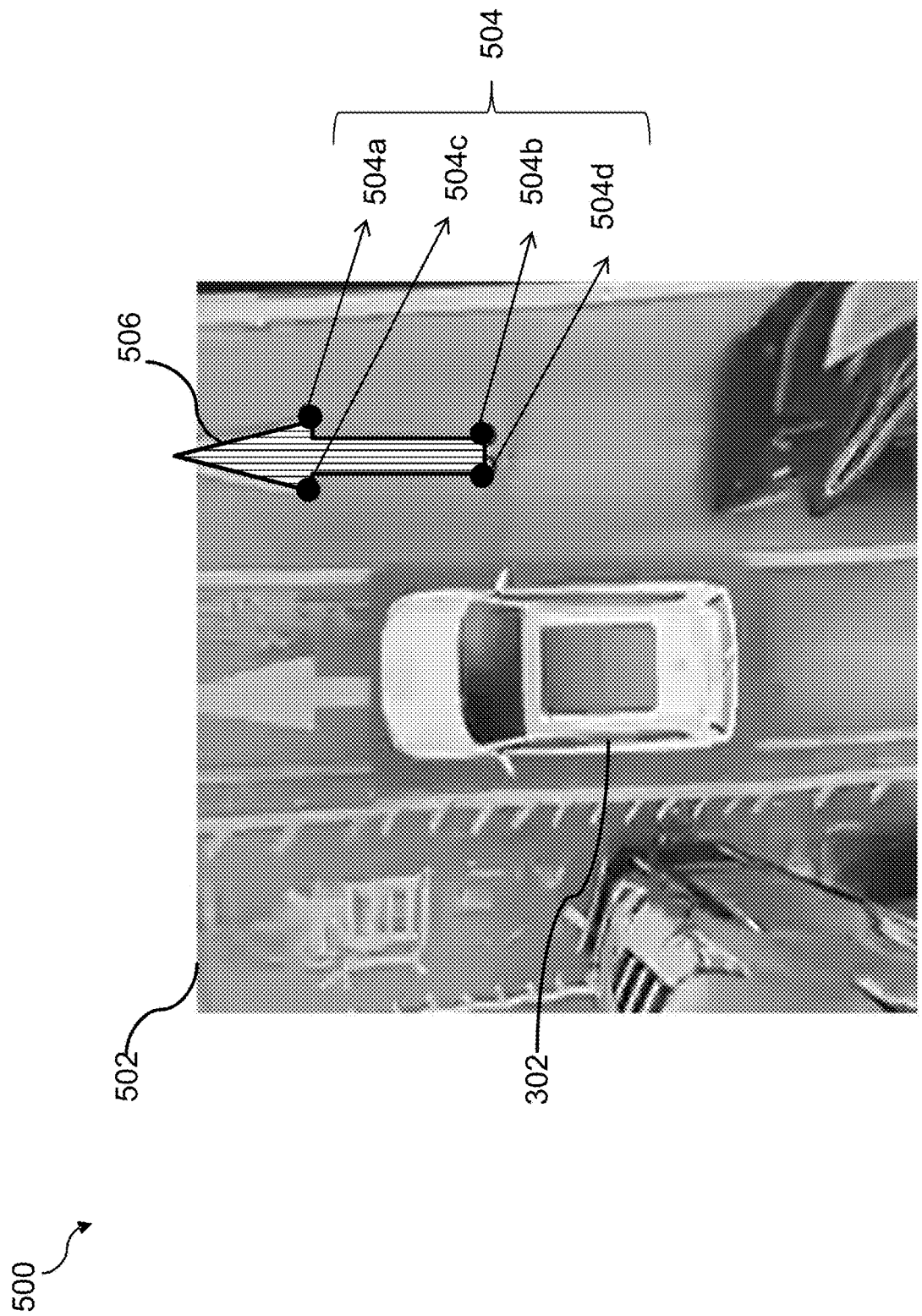
FIG. 5 is an example diagram representing a generated image associated with surrounding view of the vehicle and extracted key points, in accordance with an implementation of the present disclosure.

Referring to FIG. 5, there is shown an example diagram 500 representing a generated image 502 associated with surrounding view of the vehicle 302 and extracted key points, in accordance with an implementation of the present disclosure.

The one or more raw images are utilized to generate the image 502. The generated image 502 corresponds to the bird's eye view image with 360 degree surrounding view of the vehicle 302 that may include at least the ground of the surrounding the vehicle 302. Further, the generated image 502 may be utilized to detect a ground pattern 506 for detecting the calibration requirement. The ground pattern 506 may be commonly detected, for example, in a driveway of the vehicle 302. The ground pattern 506 may be associated with a lane marking depicted as an arrow on the ground.

In some implementations, the detected ground patterns on the road on which the vehicle 302 may be travelling may include different types of patterns such as the road object marking, the lane marking, the boundary marking, the road sign, and the traffic marking. In an example, the road object marking may correspond to markings of a stationary object on the road such as a bench on a side of the road. The lane marking may correspond to arrows depicting directions on the road. The boundary marking may correspond to marking stones on a side of the road. The road sign may correspond to regulatory, information and warning signs on the road. The traffic marking may correspond to a zebra crossing on the road.

The processor 314 may be configured to detect objects in the generated image 502 that may include sharp corners, such as the arrows, the zebra crossing, the road signs and so forth to detect the ground pattern 506. In one or more implementations, processor 314 may utilize an object detection algorithm to detect the ground pattern 506. Examples of the object detection algorithm may include, but are not limited to, a "you only look once" (YOLO) algorithm, a region-based convolutional neural network (R-CNN) algorithm, a fast R-CNN algorithm, a region-based fully convolutional networks (R-FCN) algorithm, a histogram of oriented gradients (HOG) algorithm, a single shot detector (SSD) algorithm, or spatial pyramid pooling (SPP-net) algorithm.

Referring back to FIG. 4, once the ground pattern is detected using such as any of the object detection algorithms disclosed above, at a step 404, the method 400 includes extracting at least one key point 504 associated with the detected ground pattern 506. The extracted key point comprises at least one of a corner of the ground pattern 506 or a tip of the ground pattern 506.

For example, referring again to FIG. 5, the ground pattern 506 includes the at least one key point 504. The processor 314 may extract the at least one key point 504, such as a key point 504a, a key point 504b, a key point 504c, and a key point 504d from the ground pattern 506 of the generated image 502. For example, the key point 504a, the key point 504b, the key point 504c, and the key point 504d may be the corner of the ground pattern 506 (such as the arrow).

In some implementations, the processor 314 may be configured to utilize a vision algorithm to extract the at least one key point 504 from the generated image 502. The vision algorithm may be based on manually designed features such as corner detection or blob detection with a carefully designed feature descriptor. In an implementation, the vision algorithm may be a standard corner detection algorithm, such as Harris corner detection algorithm. In addition, the vision algorithm may be based on deep learning algorithms such as the CNN, or vision transformer algorithms. In an example, an oriented FAST and rotated BRIEF (ORB) technique may be utilized to extract the at least one key point 504. Alternatively, a speeded-up robust features (SURF) technique or a Scale Invariant Feature Transform (SIFT) technique may be utilized to extract the at least one key point the generated image 502.

After the extraction of the at least one key point 504 from the generated image 502, the processor 314 may determine a relative motion parameter associated with the extracted at least one key point 504.

Referring back to FIG. 4, at a step 406, the method 400 includes determining the relative motion parameter associated with the extracted at least one key point 504 based on tracking of the extracted at least one key point 504 over a period of time. In an example, the relative motion parameter may indicate a non-straight line, or a non-parallel line associated with the tracked key points with respect to the body of the vehicle 302. In another example, the relative motion parameter may indicate a straight line, or a parallel line associated with the tracked key points with respect to the body of the vehicle 302. An example of determination of the relative motion parameter is shown in FIG. 6.

Figure 6:
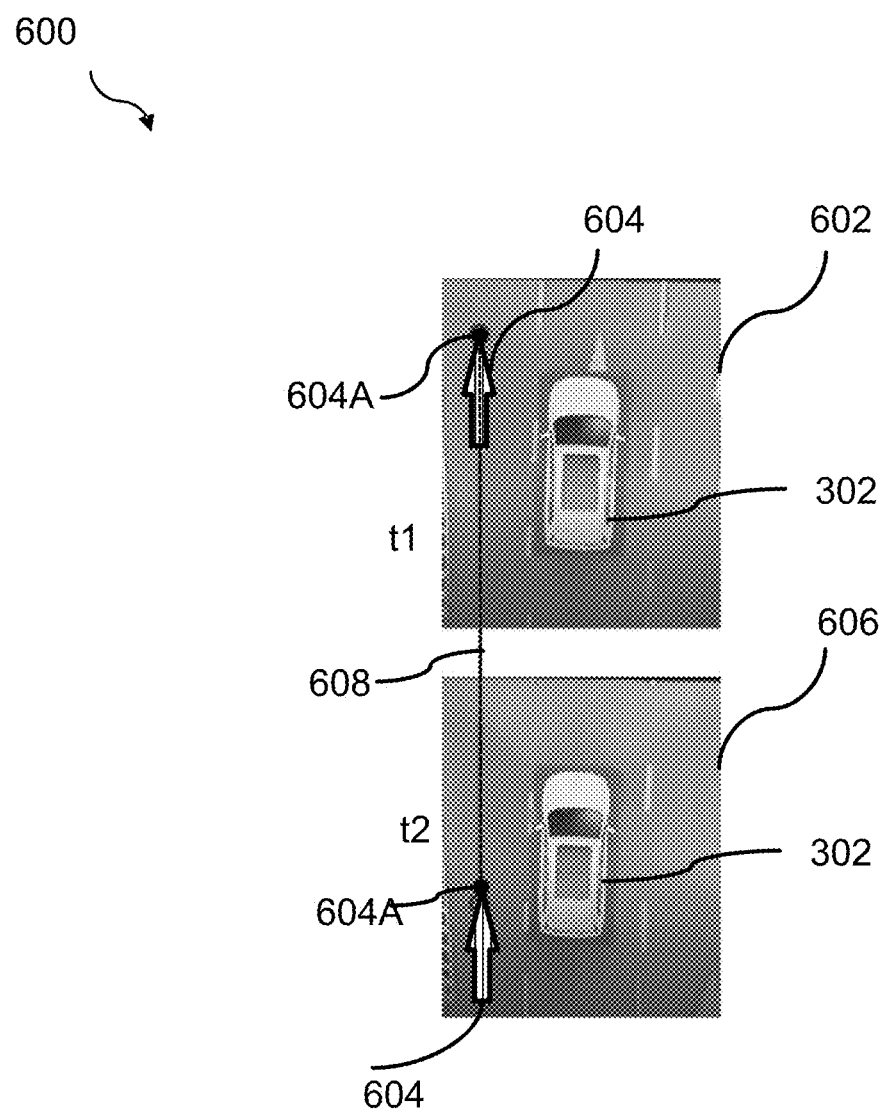
FIG. 6 is an example illustration of determination of a relative motion parameter associated with tracked at least one extracted key point relative to the vehicle, in accordance with an implementation of the present disclosure.

FIG. 6 is an example illustration 600 of determination of the relative motion parameter associated with tracked at least one extracted key point relative to the vehicle 302, in accordance with an implementation of the present disclosure. FIG. 6 is explained in conjunction with elements of FIGS. 3, 4 and 5.

The illustration 600 depicts a raw image 602 corresponding to the surroundings of the vehicle 302 at a first-time instance (t1). The raw image 602 includes a ground pattern 604. The ground pattern 604 may include a key point 604A at a first location with respect to the vehicle 302. The illustration 600 further depicts a raw image 606 corresponding to the surroundings of the vehicle 302 at a second-time instance (t2). The raw image 606 includes the ground pattern 604. The ground pattern 604 may include the key point 604A at a second location with respect to the vehicle 302.

In an example scenario, the key point 604A is tracked over a period of time. For example, the period of time may be 5 seconds. The tracking of the key point 604A may correspond to determination of the location of the key point 604A in the one or more raw images, such as the raw image 602 and the raw image 606 with respect to the body of the vehicle 302.

In some implementations, the relative motion parameter is determined by detecting the first location of the key point 604A at the first-time instance in the period of time. In addition, the second location of the key point 604A is detected at the second-time instance in the period of time. Further, a line 608 extending between the first location of the key point 604A and the second location of the key point 604A is generated. Based on an orientation of the generated line 608 with respect to the body of the vehicle 302, the relative motion parameter associated with the extracted key point 604A is determined.

In accordance with an implementation, a vehicle motion parameter based on data obtained from the one or more vehicle motion sensors, such as the steering angle sensor, the wheel speed sensor, or the IMU sensor may also be estimated. The vehicle motion parameter may be estimated to accurately determine the orientation of the generated line 608 with respect to the body of the vehicle 302. It may be noted that the method 400 may commence while the vehicle 302 possesses a straight trajectory (not turning) with respect to the ground pattern 604.

In an implementation, the vehicle motion parameter may include determination of at least a straight motion of the vehicle 302 or a speed parameter of the vehicle 302. The steering angle sensor may be utilized to determine the straight motion of the vehicle 302 on the road. The steering angle sensor may calculate a steering angle of a steering wheel of the vehicle 302 to determine the straight motion of the vehicle 302. The at least one image sensor 310 may capture the fisheye images of the surroundings of the vehicle 302 when the motion of the vehicle 302 is straight with respect to the ground pattern 604. In an example, the steering angle sensor may be one of a digital steering angle sensor or an analog steering angle sensor.

The wheel speed sensor may be utilized to determine the speed parameter of the vehicle 302. The speed parameter of the vehicle 302 may include revolutions per minute (rpm) of the wheels of the vehicle 302. The wheel speed sensor may determine the rotations of the wheel of the vehicle 302 per minute to determine the speed parameter of the vehicle 302. Further, the determination of the speed of the vehicle 302 by the wheel speed sensor solves scale ambiguity of the at least one image sensor 310.

Typically, a low speed of the vehicle 302 may be preferred while capturing the fisheye images of the surroundings of the vehicle 302 to capture clear and a greater number of fisheye images that may include the ground pattern 604. The greater number of the fisheye images may be utilized to obtain a greater number of the raw images of the surroundings of the vehicle 302. The greater number of the raw images may be utilized to extract precise locations of the key points in the raw images at different instances. In an implementation, the locations of the key points obtained in the raw images obtained may be averaged to determine the precise locations of the key points at different instances. Thus, the low speed of the vehicle 302 determined by the wheel speed sensor may enable accurate calibration of the image sensors.

Referring back to FIG. 4, at a step 408, the method 400 includes detecting the calibration requirement for the at least one image sensor 310 based on the determined relative motion parameter and the estimated vehicle motion parameter. The calibration requirement may be detected based on the determined relative motion parameter over the period of time. For example, the relative motion parameter may be determined based on the location of the key points at two time instances with respect to the vehicle 302. An example of the detection of the calibration requirement is further described in FIGS. 7A and 7B.

Figure 7B:
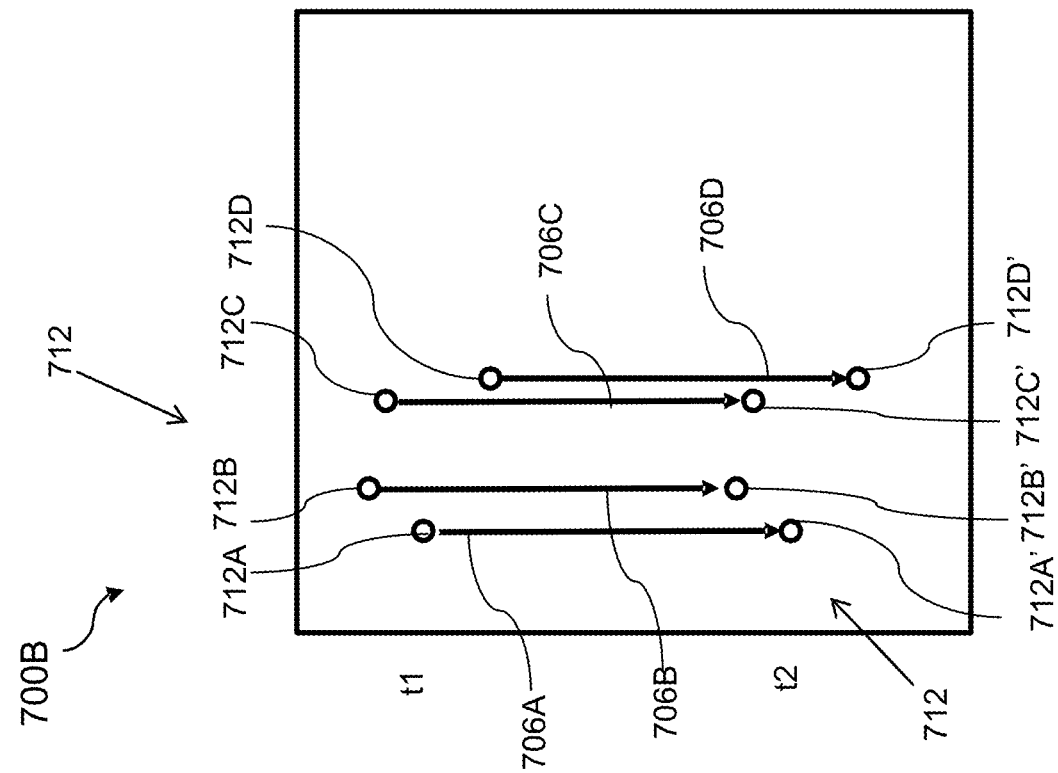
FIGS. 7A-7B illustrate examples for detection of calibration requirement for at least one image sensor, in accordance with an implementation of the present disclosure.
Figure 7A:
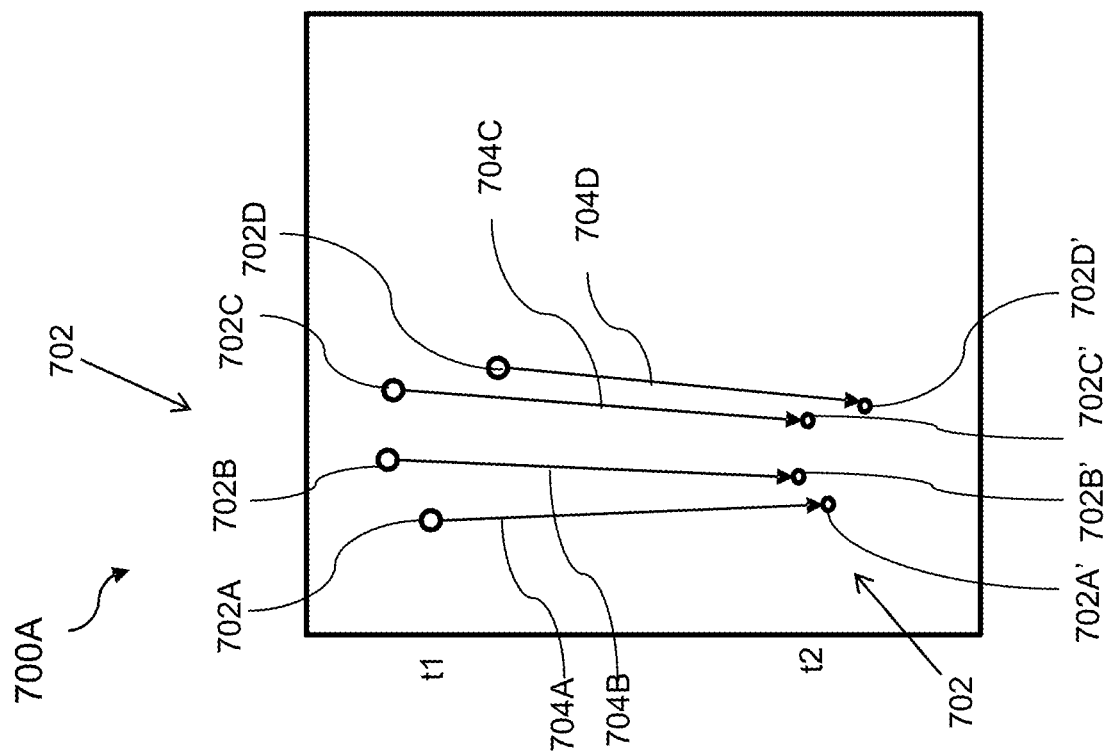

FIGS. 7A-7B illustrates detection of calibration requirement for the at least one image sensor 310, in accordance with an implementation of the present disclosure. FIGS. 7A-7B are explained in conjunction with elements of FIG. 3, FIG. 4, FIG. 5, and FIG. 6.

FIG. 7A depicts a diagram 700A. The diagram 700A includes two overlapped bird eye views associated with two time instances. The overlapped bird eye views depict one or more key points 702 at two locations as captured in the two bird eye views associated with the two time instances. In an exemplary scenario, the one or more key points 702 may include a first key point, a second key point, a third key point and a fourth key point. The diagram 700A depicts a first location of the first key point 702A, a first location of the second key point 702B, a first location of the third key point 702C and a first location of the fourth key point 702D in a first bird eye view of the overlapped bird eye views associated with the first time instance (t1). The diagram 700A further depicts a second location of the first key point 702A', a second location of the second key point 702B', a second location of the third key point 702C' and a second location of the fourth key point 702D' in a second bird eye view of the overlapped bird eye views associated with the second time instance (t2).

Further, the diagram 700A includes the line extending from the first location of each key point of the one or more key points 702 to the second location of the respective key point of the one or more key points 702. The lines are used to show the movements of the key points from a first time instance (such as t1) to a second time instance (such as t2). For example, the diagram 700A depicts a line 704A extending from the first location of the first key point 702A to the second location of the first key point 702A, a line 704B extending from the first location of the second key point 702B to the second location of the second key point 702B, a line 704C extending from the first location of the third key point 702C to the second location of the third key point 702C, and a line 704D extending from the first location of the fourth key point 702D to the second location of the fourth key point 702D.

In some implementations, the calibration requirement may be detected as a positive calibration requirement indicative of a need for calibrating one or more installation parameters of the at least one image sensor 310 when the relative motion parameter indicates a non-straight line or a non-parallel line to the body of the vehicle 302. The orientation of the line 704A, the line 704B, the line 704C and the line 704D may indicate the relative motion parameter. As shown in the diagram 700A, the line 704A, the line 704B, the line 704C and the line 704D are non-parallel lines, thereby, detecting the positive calibration requirement. The non-parallel lines, such as the line 704A, the line 704B, the line 704C and the line 704D, indicate that the at least one image sensor 310 is inaccurately calibrated as the key points in the bird eye view generated based on the raw images captured by the at least one image sensor 310 are deformed or misaligned. Thus, referring back to FIG. 3, the processor 314 indicates the need for calibrating one or more installation parameters of the at least one image sensor 310.

FIG. 7B depicts a diagram 700B. The diagram 700B includes two overlapped bird eye views associated with two time instances. The overlapped bird eye views depict the one or more key points 712, such as the first key point 712A, the second key point 712B, the third key point 712C and the fourth key point 712D at two locations as captured in the two bird eye views associated with the two time instances. The first positions for these four key points are indicated by 712A, 712B, 702C, and 712D, respectively. The second positions for these four key points are indicated by 712A', 712B', 712C', and 712D', respectively.

Further, the diagram 700B includes the line extending the first location of each key point of the one or more key points 712 to the second location of the respective key point of the one or more key points 712. For example, the diagram 700B depicts a line 706A extending from the first location of the first key point 712A to the second location of the first key point 712A, a line 706B extending from the first location of the second key point 712B to the second location of the second key point 712B, a line 706C extending from the first location of the third key point 712C to the second location of the third key point 712C, and a line 706D extending from the first location of the fourth key point 712D to the second location of the fourth key point 712D.

In some implementations, the calibration requirement may be detected as a negative calibration requirement indicative of no need for calibrating the one or more installation parameters of the at least one image sensor 310 when the relative motion parameter indicates at least one of a straight line or a parallel line to the body of the vehicle 302. The orientation of the line 706A, the line 706B, the line 706C and the line 706D may indicate the relative motion parameter. As shown in the diagram 700B, the line 706A, the line 706B, the line 706C and the line 706D are parallel lines, thereby, detecting the negative calibration requirement. The parallel lines, such as the line 706A, the line 706B, the line 706C and the line 706D indicates that the at least one image sensor 310 is accurately calibrated as the key points in the bird eye view generated based on the raw images captured by the at least one image sensor 310 is aligned as required. Thus, the processor 314 indicates that there is no need for calibrating one or more installation parameters of the at least one image sensor 310. Therefore, in such a manner the calibration requirement of the at least one image sensor 310 may be determined.

Referring again FIG. 4, at a step 410, the method 400 includes generating the output signal 318 based on the calibration requirement. In some implementations, the output signal 318 may be generated to trigger a re-calibration algorithm when the positive calibration requirement is detected. The re-calibration algorithm can also be performed, for example, by the process in FIG. 9. The re-calibration algorithm may be utilized to adjust installation parameters or extrinsic parameters of the at least one image sensor 310. For example, the installation parameters may correspond to an installation position of the at least one image sensor 310 on the vehicle 302, or an orientation of the at least one image sensor 310 with respect to the vehicle 302.

In an implementation, the output signal 318 may be generated to perform calibration of the installation parameters of the at least one image sensor 310 based on the estimated vehicle motion parameter. For example, the re-calibration algorithm may be triggered based on the determination that the vehicle 302 is traveling in the straight motion and at the low speed (e.g., 20 miles per hour). The straight motion of the vehicle 302 may ensure that the body of the vehicle 302 is parallel to the ground pattern 604. The low speed of the vehicle 302 may enable capture of multiple fisheye images with a same ground pattern in the surrounding of the vehicle 302. The fisheye images with the same ground pattern may be stitched to form multiple bird eye views of the surrounding of the vehicle 302 with the same ground pattern. Therefore, the location of the key points may be precisely detected by averaging the multiple generated bird eye views of the surrounding of the vehicle 302. Thus, the at least one image sensor 310 may be accurately calibrated in real-time by use of commonly available ground patterns in the surrounding of the vehicle 302. Example processes for the generation of the output signal 318 are further explained in FIGS. 8, 9, 10 and 11.

It may be noted that the method 400 is explained to have above stated process steps; however, those skilled in the art would appreciate that the method 400 may have more/a smaller number of process steps which may enable all the above stated implementations of the present disclosure.

Figure 8:
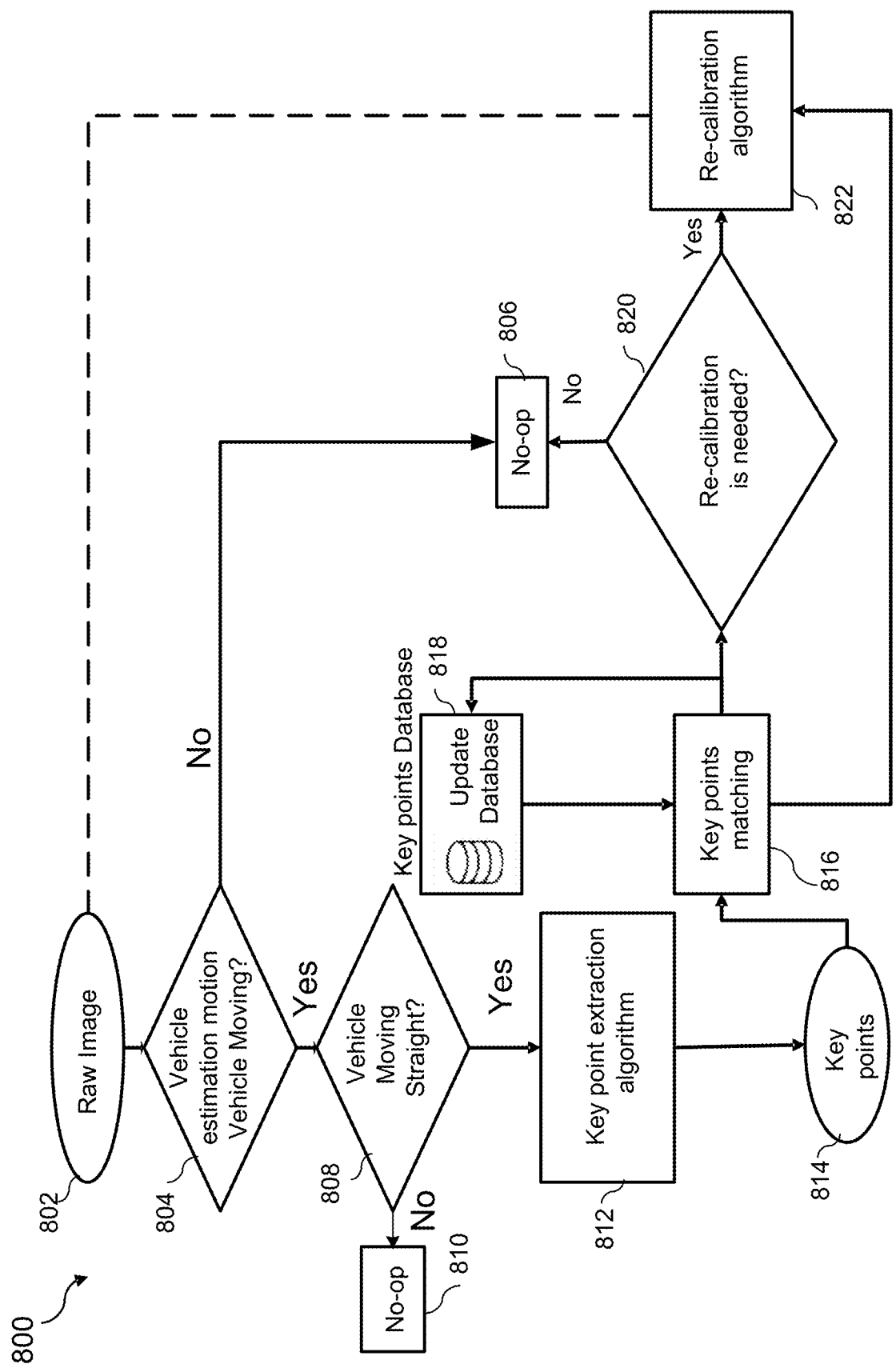
FIG. 8 is an example process for detecting the calibration requirement for the at least one image sensor of the vehicle, in accordance with an implementation of the present disclosure.

FIG. 8 is another example process 800 for detecting the calibration requirement for the at least one image sensor 310 of the vehicle 302, in accordance with an implementation of the present disclosure. FIG. 8 is explained in conjunction with the elements of FIG. 3, 4, 5, 6, 7A and 7B. The process 800 initiates at a step 802.

At step 802, the raw image is obtained from the at least one image sensors 310. The raw image may be the fisheye images captured by the at least one image sensor 310. Based on the raw image, the image of the surroundings of the vehicle 302, such as the image 502 may be generated. Further, at a step 804, the motion of the vehicle 302 may be estimated. For example, the vehicle 302 may be moving. The motion of the vehicle 302 may be estimated based on the steering angle sensor and the wheel speed sensor. For example, the motion of the vehicle 302 may be straight, which is described below. In case the vehicle 302 may not be moving, the processor 314, at a step 806 may perform no operation.

When the motion of the vehicle 302 may be estimated, processor 314, at a step 808, may check if the motion of the vehicle 302 is straight. If the motion of the vehicle 302 is not straight, the processor 314, at a step 810 may perform no operation. If the motion of the vehicle 302 is straight, the processor 314 may, at a step 812, may apply the key point extraction algorithm on the image 502 to estimate the at least one key point. Details of the key point extraction algorithm are further provided for example, in FIG. 5.

Based on the application of the key point extraction algorithm, at a step 814, the at least one key point 504 may be extracted from the ground pattern 506 in the image 502. For example, the at least one key point 504 may be extracted from the ground pattern 506 at two time instances. At a step 816, the location of the key points at the first time instance may be matched with the location of the key points at the second time instance. The key points associated with the first time instance may be retrieved from a database, such as the database 320. Details of the matching of the key points, such as the key point 604A are further provided in FIG. 6. At a step 818, the database 320 may be updated to store one or more of the extracted key points.

Based on the matching of the key points, at step 820, the processor 314 may determine the calibration requirement. If the calibration requirement is detected to be negative, the processor 314 may perform no operation. If the calibration requirement is detected to be positive, the processor 314 may, at step 822, initiate the re-calibration algorithm for the at least one image sensor 310 of the vehicle 302, which can be performed, for example, by the process described below in connection with FIG. 9. Details of the determination of the calibration requirement are further explained, for example, in FIGS. 7A and 7B.

Figure 9:
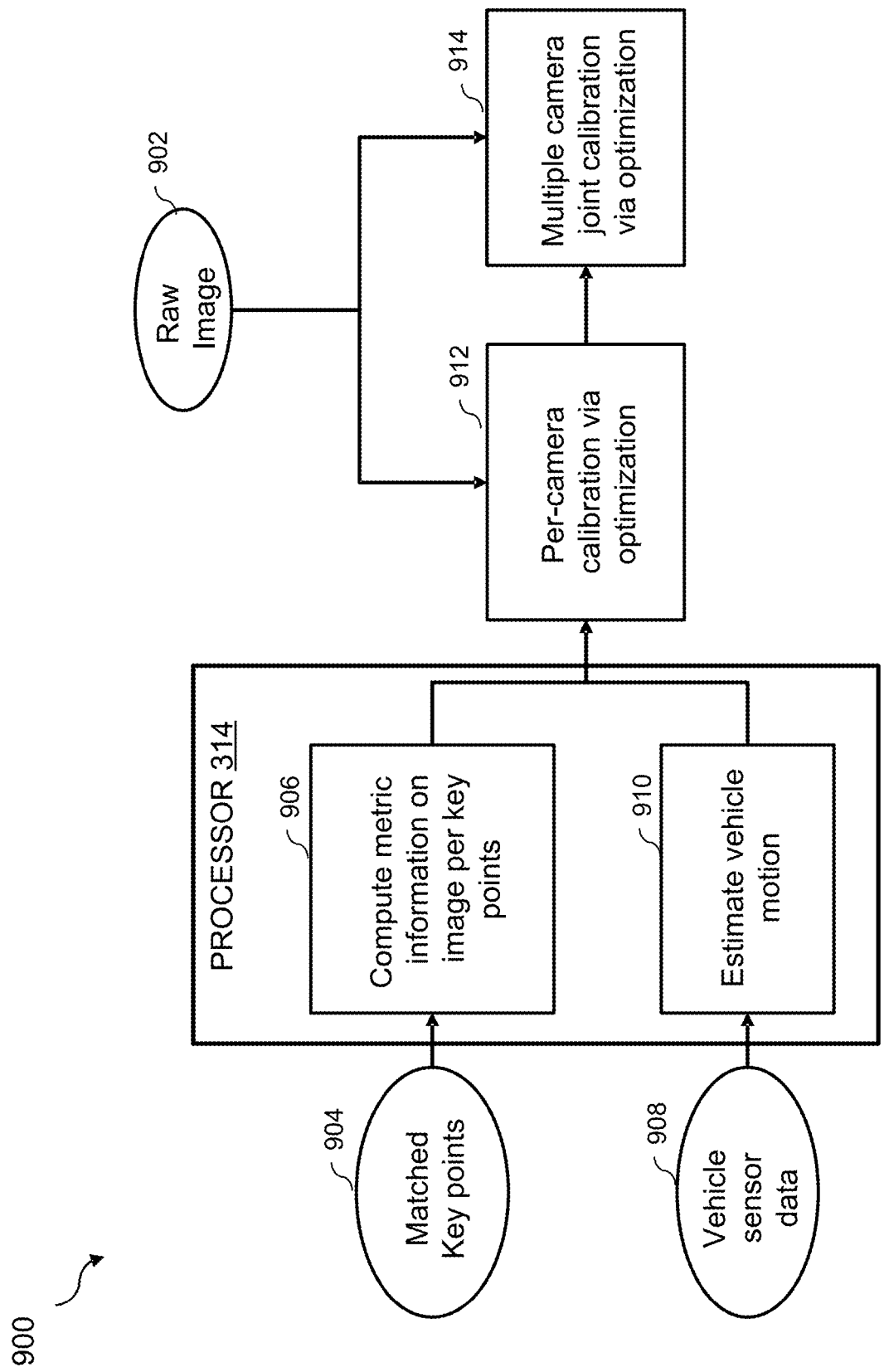
FIG. 9 is an example process for performing single sensor calibration and multiple sensor joint calibration, in accordance with an implementation of the present disclosure.

FIG. 9 is an example process 900 for performing single sensor calibration and multiple sensor joint calibration, in accordance with an implementation of the present disclosure. FIG. 9 is described in conjunction with the elements of FIGS. 3, 4, 8. For example, after generating the output signal 318 in system 300, or step 410 of process 400, the example process 900 can be used to recalibrate installation parameters for the at least one image sensor 310 of the vehicle 302. Process 900 can also be used to perform re-calibration algorithm as described above , for example, at step 822 of process 800.

The process 900 initiates at a step 902. At step 902, the raw images (such as the fisheye images) are obtained from the at least one image sensor 310. The raw images are stitched together to generate the image 502 having 360 degree surrounding view of the vehicle 302. The image 502 may be utilized by the processor 314 to extract the key points (such as shown at step 814 of the process 800).

The matched key points (such as, for example, the matched key points generated at the step 816 of the process 800) are provided as input to the processor 314, at a step 904. The processor 314 may, at a step 906, utilize the input matched key points to compute metric information on the generated image 502 associated with each key point, such as the at least one key point 504.

Furthermore, at a step 908, the vehicle sensor data, such as acquired from the or more vehicle motion sensors 312 (e.g., the steering angle sensor and the wheel speed sensor) is provided as input to the processor 314. The processor 314, at a step 910, may estimate the motion of the vehicle 302.

Based on the computed metric information, the determined straight motion, and the low speed of the vehicle 302, the processor 314 may output optimization parameters to re-calibrate the at least one image sensor 310. At a step 912, the processor 314 may output optimization parameters for calibration of single camera or sensor of the at least one image sensor 310 calibration that may require calibration. At a step 914, the processor 314 may output optimization parameters for calibration of multiple cameras or sensors of the at least one image sensor 310 that may require calibration.

Figure 10:
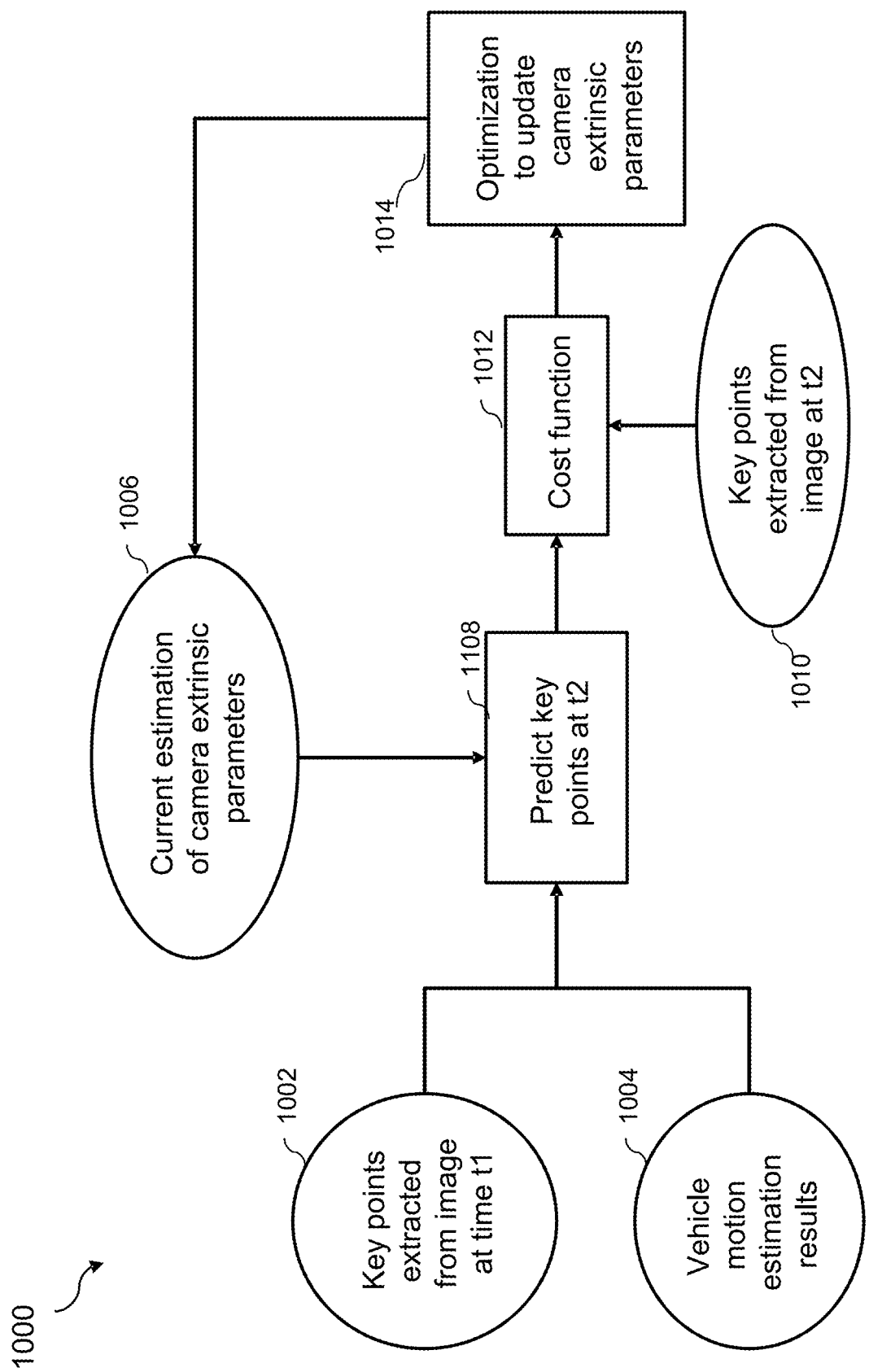
FIG. 10 is an example process for determination of optimization parameters to update installation parameters of the at least one image sensor, in accordance with an implementation of the present disclosure.

In some implementations, step 912 can be performed by a process according to, for example, FIG. 10. Step 914 can be performed by a process according to, for example, FIG. 11, as will be described below.

FIG. 10 is an example process 1000 for determination of optimization parameters to update installation parameters of the at least one image sensor 310 (e.g., by per-camera calibration at step 912 of process 900), in accordance with some implementations. FIG. 10 is described in conjunction with elements of FIGS. 3, 4, 6, and 9. For example, the process 1000 can be performed at step 912 of FIG. 9.

The process 1000 initiates at step 1002. At a step 1002, the key points are extracted from the generated image, such as the raw image 602 at time the first time instance (t1). Further, at a step 1004, the straight motion of the vehicle 302 is estimated. At a step 1006, the processor 314 estimates current extrinsic parameters of the at least one image sensor 310.

Based on the key points extracted from the raw image 602, the straight motion of the vehicle 302 and the current extrinsic parameters of the at least one image sensor 310, the processor 314, at a step 1008 predicts the key points at the second time instance (t2). The processor 314, at a step 1010 extracts the key points from the generated image, such as the raw image 606 at the second time instance (t2). At a step 1012, the processor 314 compares the predicted key points at the second time instance and the extracted key points from the raw image 606 at the second time instance. Based on the comparison, the processor 314 determines a cost function that indicates an amount of error between the predicted key points and the extracted key points at the second time instance. At a step 1014, the processor 314 outputs the optimization parameters to adjust the installation parameters or the extrinsic parameters of the at least one image sensor 310 based on the determined cost function.

Figure 11:
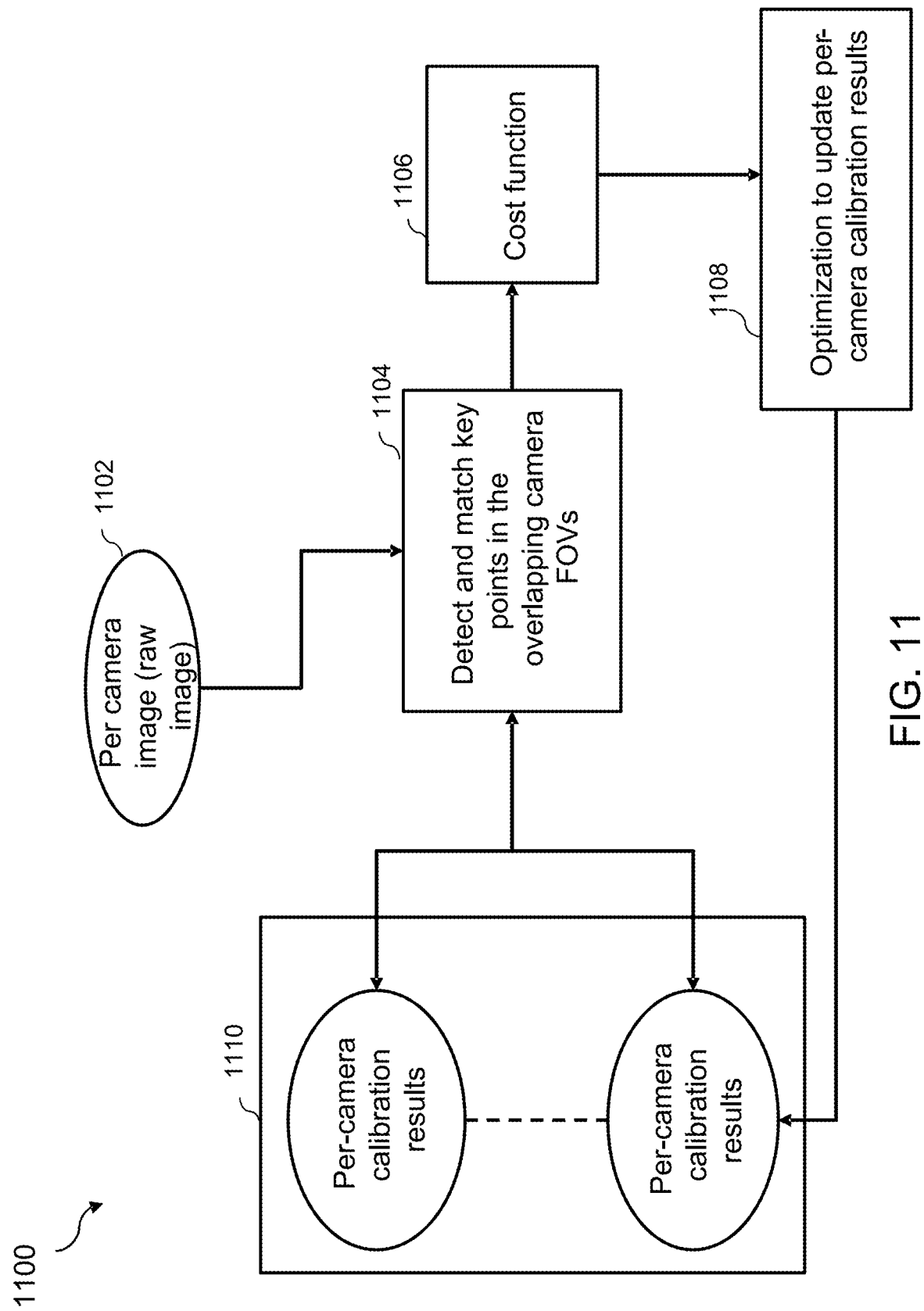
FIG. 11 is an example process for determination of the optimization parameters for re-calibration of the at least one image sensor, in accordance with an implementation of the present disclosure.

FIG. 11 is an example process 1100 for determination of optimization parameters for re-calibration of the at least one image sensor 310 (e.g., by multiple camera joint calibration at step 914 of process 900), in accordance with some implementations. FIG. 11 is described in conjunction with the elements of FIGS. 3, 4, 8, 9 and 10. For example, the process 1100 can be performed at step 914 of process 900.

The process 1100 starts at step 1102. At a step 1102, the processor 314 may receive the raw images (such as the fisheye views) captured by each sensor of the at least one image sensor 310. At a step 1104, the processor 314 may utilize the raw images to detect and match the key points in the overlapping camera field of views (FOVs). For example, an FOV of a first sensor of the at least one image sensor 310 positioned at the front end of the vehicle 302 and an FOV of a second sensor of the at least one image sensor 310 positioned at the left side end of the vehicle 302 may overlap. The processor 314 may match the key points in the raw images captured by the first sensor and the second sensor of the at least one image sensor 310.

The processor 314 may, at a step 1106, may determine the cost function based on a difference between the key points in the raw images captured by the first sensor and the second sensor of the at least one image sensor 310. The processor 314 may, at a step 1108, may further output the optimization parameters for re-calibration for each sensor of the at least one image sensor 310 based on the determined cost function for each sensor of the at least one image sensor 310. The processor 314 may, at a step 1110, may utilize the per-camera calibration results or the optimization parameters for re-calibration for each sensor of the at least one image sensor 310 to further match the key points in the captured raw images for real-time calibration of each sensor of the at least one image sensor 310.

Referring again to FIG. 3, the server 306 is a computer program or device that provides functionality for other programs or devices. The server 306 provides various functionalities, such as sharing data or resources among multiple clients, or performing computation for a client. However, those skilled in the art would appreciate that the system 300 may be connected to a greater number of servers.

The server 306 may be configured to manage each operation and task performed by the apparatus 304. In one implementation, the server 306 is located remotely. The server 306 may be associated with an administrator. The administrator manages different components associated with the apparatus 304. The administrator may be a person or an individual who monitors the working of the apparatus 304 and the server 306 in real-time. The administrator monitors the working of the apparatus 304 and the server 306 through a computing device. The computing device may include but is not limited to, a laptop, a desktop computer, a tablet, or a personal digital assistant. Furthermore, the server 306 includes a database 320. The database 320 stores sensor data received from the at least one image sensor 310 and the one or more vehicle motion sensors 312. The sensor data is associated with the vehicle 302 and the surrounding view of the vehicle 302. The database 320 organizes the sensor data using model such as relational models or hierarchical models. The database 320 may further store data provided by the administrator.

The communication network 308 may be a wired, wireless, or any combination of wired and wireless communication networks, such as cellular, Wi-Fi, internet, local area networks, or the like. The vehicle 302, the apparatus 304 and the server 306 may be communicatively coupled via the communication network 308. In some implementations, the communication network 308 may include one or more networks such as a data network, a wireless network, a telephony network, or any combination thereof. It is contemplated that the data network may be any local area network (LAN), metropolitan area network (MAN), wide area network (WAN), a public data network (e.g., the Internet), short range wireless network, or any other suitable packet-switched network, such as a commercially owned, proprietary packet-switched network, e.g., a proprietary cable or fiber-optic network, and the like, or any combination thereof. In addition, the wireless network may be, for example, a cellular network and may employ various technologies including enhanced data rates for global evolution (EDGE), general packet radio service (GPRS), global system for mobile communications (GSM), Internet protocol multimedia subsystem (IMS), universal mobile telecommunications system (UMTS), etc., as well as any other suitable wireless medium, e.g., worldwide interoperability for microwave access (WiMAX), Long Term Evolution (LTE) networks (for e.g. LTE-Advanced Pro), 5G New Radio networks, ITU-IMT 2020 networks, code division multiple access (CDMA), wideband code division multiple access (WCDMA), wireless fidelity (Wi-Fi), wireless LAN (WLAN), Bluetooth, Internet Protocol (IP) data casting, satellite, mobile ad-hoc network (MANET), and the like, or any combination thereof.

Figure 12:
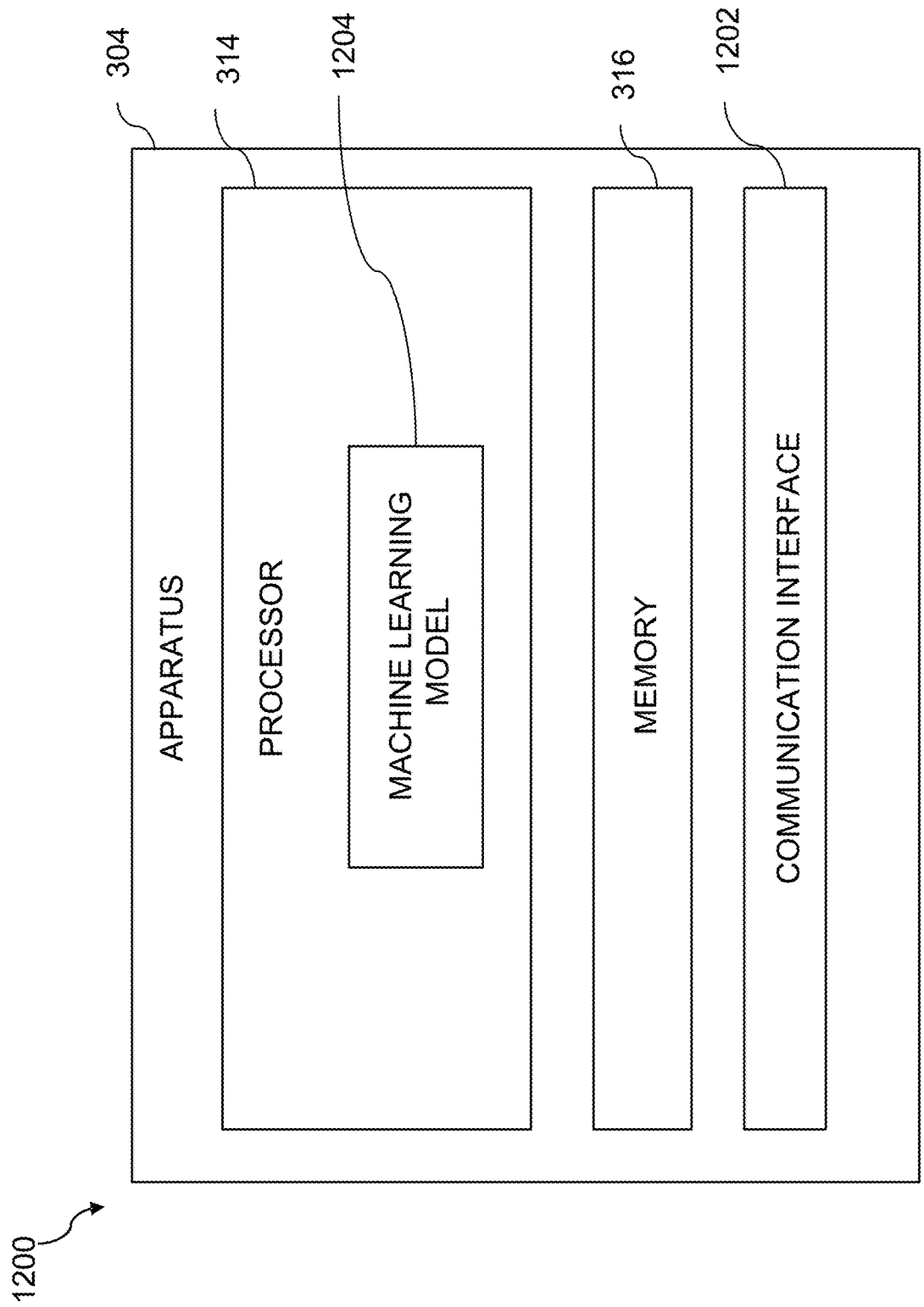
FIG. 12 is an example block diagram of an apparatus for detecting the calibration requirement for the at least one image sensor, in accordance with an implementation of the present disclosure.

FIG. 12 is an example block diagram 1200 of the apparatus 304 for detecting the calibration requirement for the at least one image sensor 310, in accordance with an implementation of the present disclosure. FIG. 12 is explained in conjunction with the elements of FIGS. 3, 4, 5, 6, 7A, 7B, 8, 9, 10 and 11. The apparatus 304 includes the processor 314, the memory 316 and a communication interface 1202.

The processor 314 may retrieve computer program code instructions that may be stored in the memory 316 for execution of the computer program code instructions. The processor 314 may be embodied in a number of different ways. For example, the processor 314 may be embodied as one or more of various hardware processing means such as a coprocessor, a microprocessor, a controller, a digital signal processor (DSP), a processing element with or without an accompanying DSP, or various other processing circuitry including integrated circuits such as, for example, an ASIC (application specific integrated circuit), an FPGA (field programmable gate array), a microcontroller unit (MCU), a hardware accelerator, a special-purpose computer chip, or the like. As such, in some implementations, the processor 314 may include one or more processing cores configured to perform independently. A multi-core processor may enable multiprocessing within a single physical package. Additionally, or alternatively, the processor 314 may include one or more processors configured in tandem via the bus to enable independent execution of instructions, pipelining and/or multithreading.

In some implementations, the processor 314 may be configured to provide Internet-of-Things (IoT) related capabilities to users of the apparatus 304. In some implementations, the users may be or correspond to driver of the vehicle 302. The IoT related capabilities may in turn be used to provide smart driving solutions.

In an example implementation, the processor 314 may be in communication with the memory 316 via a bus for passing information among components coupled to the apparatus 304. The memory 316 may be non-transitory and may include, for example, one or more volatile and/or non-volatile memories. In other words, for example, the memory 316 may be an electronic storage device (for example, a computer readable storage medium) comprising gates configured to store data (for example, bits) that may be retrievable by a machine (for example, a computing device like the processor 110). The memory 316 may be configured to store information, data, content, applications, instructions, or the like, for enabling the apparatus to conduct various functions in accordance with an example implementation of the present disclosure. For example, the memory 316 may be configured to buffer data for processing by the processor 314.

As exemplarily illustrated in FIG. 12, the memory 316 may be configured to store instructions for execution by the processor 314. As such, whether configured by hardware or software methods, or by a combination thereof, the processor 314 may represent an entity (for example, physically embodied in circuitry) capable of performing operations according to an implementation of the present disclosure while configured accordingly. Thus, for example, when the processor 314 is embodied as an ASIC, FPGA or the like, the processor 314 may be specifically configured hardware for conducting the operations described herein. Alternatively, as another example, when the processor 314 is embodied as an executor of software instructions, the instructions may specifically configure the processor 314 to perform the algorithms and/or operations described herein when the instructions are executed. However, in some cases, the processor 314 may be a processor specific device (for example, a mobile terminal or a fixed computing device) configured to employ an implementation of the present disclosure by further configuration of the processor 314 by instructions for performing the algorithms and/or operations described herein. The processor 314 may include, among other things, a clock, an arithmetic logic unit (ALU) and logic gates configured to support operation of the processor 314.

Further, the processor 314 includes a machine learning model 1204. Further, the machine learning model 1204 is configured to apply machine learning algorithm to the sensor data for performing detection of the calibration requirement. In addition, the machine learning model 1204 is configured to apply the computer vision algorithm based on deep learning on the sensor data. The computer vision algorithm enables real time capturing and collection of the image data through the at least one image sensor 310.

The communication interface 1202 may comprise input interface and output interface for supporting communications to and from the apparatus 304 or any other component with which the apparatus 304 may communicate. The communication interface 1202 may be any means such as a device or circuitry embodied in either hardware or a combination of hardware and software that is configured to receive and/or transmit data to/from a communications device in communication with the apparatus 304. In this regard, the communication interface 1202 may include, for example, an antenna (or multiple antennae) and supporting hardware and/or software for enabling communications with a wireless communication network. Additionally, or alternatively, the communication interface 1202 may include the circuitry for interacting with the antenna(s) to cause transmission of signals via the antenna(s) or to manage receipt of signals received via the antenna(s). In some environments, the communication interface 1202 may alternatively or additionally support wired communication. As such, for example, the communication interface 1202 may include a communication modem and/or other hardware and/or software for supporting communication via cable, digital subscriber line (DSL), universal serial bus (USB) or other mechanisms. In some implementations, the communication interface 1202 may enable communication with a cloud-based network to enable deep learning, such as using the machine learning model 1204.

Figure 13:
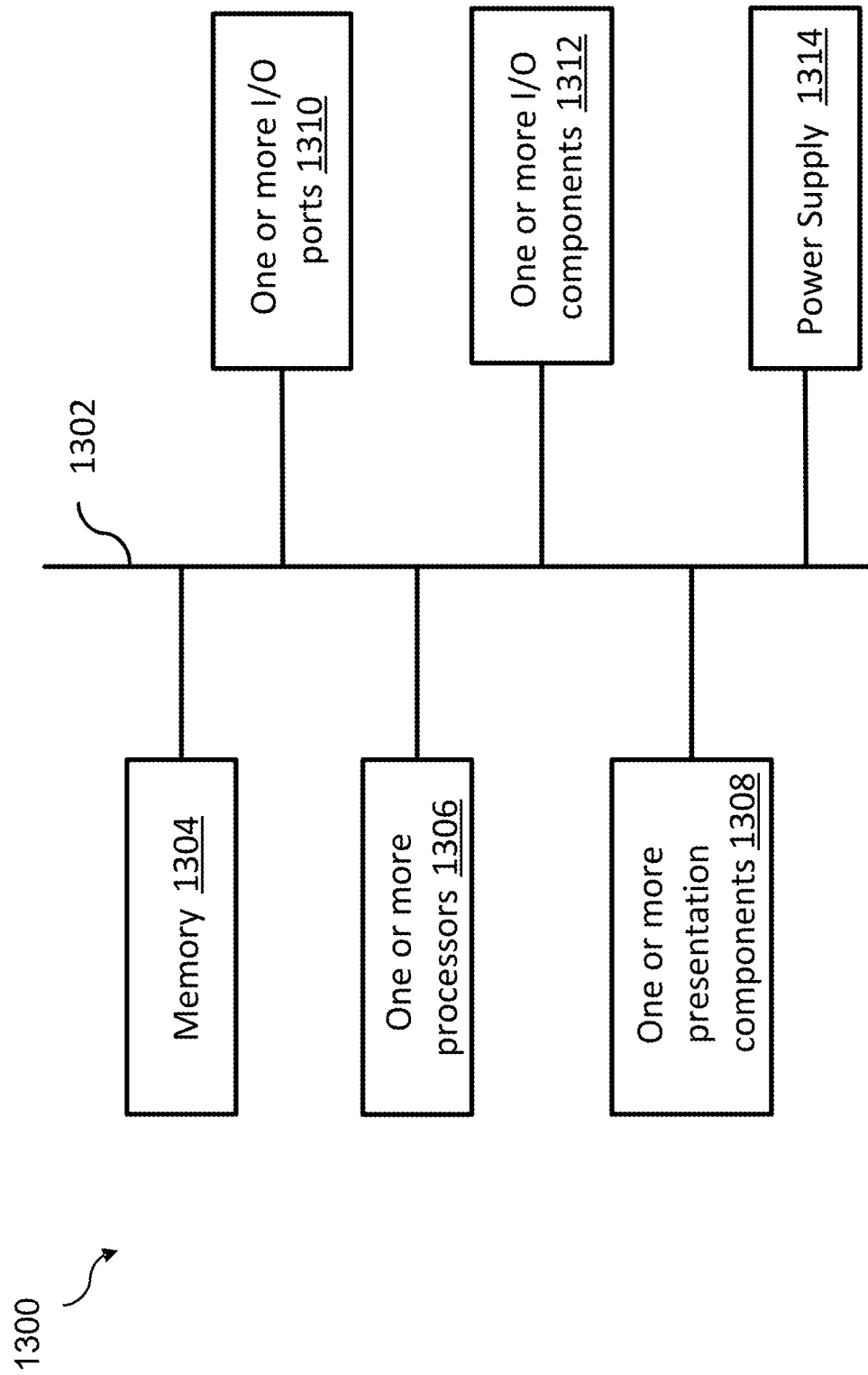
FIG. 13 is an example block diagram illustrating internal components of the apparatus, in accordance with an implementation of the present disclosure.

FIG. 13 is an example block diagram 1300 illustrating internal components of the apparatus 304, in accordance with an implementation of the present disclosure. FIG. 13 is explained in conjunction with the elements of FIGS. 3, 4, 5, 6, 7A, 7B, 8, 9, 10, 11 and 12.

The internal components of the apparatus 304 includes a bus 1302 that directly or indirectly couples the following devices: memory 1304, one or more processors 1306, one or more presentation components 1308, one or more input/output (I/O) ports 1310, one or more input/output components 1312, and an illustrative power supply 1314. The bus 1302 represents what may be one or more busses (such as an address bus, data bus, or combination thereof). Although the various blocks of FIG. 13 are shown with lines for the sake of clarity, in reality, delineating various components is not so clear, and metaphorically, the lines would more accurately be grey and fuzzy. For example, one may consider a presentation component such as a display device to be an I/O component. It may be understood that the diagram of FIG. 13 is merely illustrative of an example queuing system 108 that can be used in connection with one or more implementations of the present disclosure. The distinction is not made between such categories as "workstation," "server," "laptop," "hand-held device," etc., as all are contemplated within the scope of FIG. 13 and reference to "the apparatus 304 of FIG. 3."

The block diagram 1300 typically includes a variety of computer-readable media. The computer-readable media can be any available media that can be accessed by the apparatus 304 and includes both volatile and nonvolatile media, removable and non-removable media. By way of example, and not limitation, the computer-readable media may comprise computer readable storage media and communication media. The computer readable storage media includes volatile and nonvolatile, removable, and non-removable media implemented in any method or technology for storage of information such as computer-readable instructions, data structures, program modules or other data.

The computer-readable storage media with memory 1304 includes, but is not limited to, non-transitory computer readable media that stores program code and/or data for longer periods of time such as secondary or persistent long term storage, like RAM, ROM, EEPROM, flash memory or other memory technology, CD-ROM, digital versatile disks (DVD) or other optical disk storage, magnetic cassettes, magnetic tape, magnetic disk storage or other magnetic storage devices, or any other medium which can be used to store the desired information and which can be accessed by the apparatus 304. The computer-readable storage media associated with the memory 1304 and/or other computer-readable media described herein can be considered computer readable storage media for example, or a tangible storage device. The communication media typically embodies computer-readable instructions, data structures, program modules or other data in a modulated data signal such as a carrier wave or other transport mechanism and in such a includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared, and other wireless media. Combinations of any of the above should also be included within the scope of computer-readable media. The block diagram 1300 includes one or more processors 1306 that read data from various entities such as the memory 1304 or I/O components 1312. The one or more presentation components 1308 present data indications to a user or other device. Example presentation components include a display device, speaker, printing component, vibrating component, etc. The one or more I/O ports 1310 allow the apparatus 304 to be logically coupled to other devices including the one or more I/O components 1312, some of which may be built in. Illustrative components include a microphone, joystick, game pad, satellite dish, scanner, printer, wireless device, etc.

The above-described implementations of the present disclosure may be implemented in any of numerous ways. For example, the implementations may be implemented using hardware, software, or a combination thereof. When implemented in software, the software code may be executed on any suitable processor or collection of processors, whether provided in a single computer or distributed among multiple computers. Such processors may be implemented as integrated circuits, with one or more processors in an integrated circuit component. Though, a processor may be implemented using circuitry in any suitable format.

Also, the various methods or processes outlined herein may be coded as software that is executable on one or more processors that employ any one of a variety of operating systems or platforms. Additionally, such software may be written using any of a number of suitable programming languages and/or programming or scripting tools, and also may be compiled as executable machine language code or intermediate code that is executed on a framework or virtual machine. Typically, the functionality of the program modules may be combined or distributed as desired in various implementations.

Also, the implementations of the present disclosure may be embodied as a method, of which an example has been provided. The acts performed as part of the method may be ordered in any suitable way. Accordingly, implementations may be constructed in which acts are performed in an order different than illustrated, which may include performing some acts concurrently, even though shown as sequential acts in illustrative implementations. Therefore, it is the object of the appended claims to cover all such variations and modifications as come within the true spirit and scope of the present disclosure.

Although the present disclosure has been described with reference to certain preferred implementations, it is to be understood that various other adaptations and modifications can be made within the spirit and scope of the present disclosure. Therefore, it is the aspect of the append claims to cover all such variations and modifications as come within the true spirit and scope of the present disclosure.

What is claimed is:

1. A method for detecting a calibration requirement for at least one image sensor, comprising:
   detecting a ground pattern in a generated image associated with a surrounding view of a vehicle;
   extracting at least one key point associated with the detected ground pattern, from the generated image;
   determining a relative motion parameter associated with the extracted at least one key point based on tracking of the extracted at least one key point over a period of time, further comprising:
      detecting a first location of the at least one key point at a first-time instance in the period of time;
      detecting a second location of the at least one key point at a second time instance in the period of time;
      generating a line extending between the first location and the second location; and
      determining the relative motion parameter associated with the extracted at least one key point based on an orientation of the generated line with respect to the vehicle's body;
   detecting calibration requirement for the image sensor based on the determined relative motion parameter; and
   generating an output signal based on the detected calibration requirement.

2. The method of claim 1, wherein detecting the calibration requirement for the at least one image sensor based on the determined relative motion parameter further comprises:
   detecting the calibration requirement as a positive calibration requirement indicative of a need for calibrating one or more installation parameters of the at least one image sensor when the relative motion parameter indicates a non-straight line or a non-parallel line relative to the vehicle's body; and
   detecting the calibration requirement as a negative calibration requirement indicative of no need for calibrating the one or more installation parameters of the at least one image sensor when the relative motion parameter indicates at least one of a straight line or a parallel line to the vehicle's body.

3. The method of claim 2, further comprising:
   generating the output signal to trigger a re-calibration algorithm when the positive calibration requirement is detected.

4. The method of claim 1, wherein the generated image is associated with a raw image captured using the at least one image sensor.

5. The method of claim 1, wherein the ground pattern is associated with at least one of: a road object marking, a lane marking, a boundary marking, a road sign, or a traffic marking.

6. The method of claim 5, wherein the extracted key point comprises at least one of: a corner of the ground pattern or a tip of the ground pattern.

7. The method of claim 1, further comprising:
   estimating a vehicle motion parameter based on data obtained from one or more vehicle motion sensors; and
   generating the output signal to perform calibration of installation parameters of the at least one image sensor based on the estimated vehicle motion parameter.

8. The method of claim 7, wherein the one or more vehicle motion sensors comprise at least one of: a steering angle sensor, a wheel speed sensor, or an inertial measurement unit (IMU).

9. The method of claim 7, wherein the vehicle motion parameter comprises at least a vehicle speed parameter.

10. An apparatus for detecting a calibration requirement for at least one image sensor, the apparatus comprising:
    a memory configured to store computer-executable instructions; and
    at least one processor configured to execute the computer-executable instructions to:
       detect a ground pattern in a generated image associated with a surrounding of a vehicle;
       extract at least one key point associated with the detected ground pattern, from the generated image;
       determine a relative motion parameter associated with the extracted at least one key point based on tracking of the extracted at least one key point over a period of time, wherein the instructions to determine the relative motion parameter associated with the extracted at least one key point further comprise instructions to:
          detect a first location of the at least one key point at a first-time instance in the period of time;
          detect a second location of the at least one key point at a second time instance in the period of time;
          generate a line extending between the first location and the second location; and
          determine the relative motion parameter associated with the extracted at least one key point based on an orientation of the generated line with respect to the vehicle's body;
       detect calibration requirement for the at least one image sensor based on the determined relative motion parameter; and
       generate an output signal based on the detected calibration requirement.

11. The apparatus of claim 10, wherein the instructions to detect the calibration requirement for the at least one image sensor based on the determined relative motion parameter further comprise instructions to:
    detect the calibration requirement as a positive calibration requirement indicative of a need for calibrating one or more installation parameters of the at least one image sensor when the relative motion parameter indicates a straight line parallel to the vehicle's body; and
    detect the calibration requirement as a negative calibration requirement indicative of no need for calibrating one or more installation parameters of the at least one image sensor when the relative motion parameter indicates at least one of a non-straight line or a non-parallel line to the vehicle's body.

12. The apparatus of claim 10, wherein the ground pattern is associated with at least one of: a road object marking, a lane marking, a boundary marking, a road sign, or a traffic marking.

13. The apparatus of claim 12, wherein the extracted key point comprises at least one of: a corner of the ground pattern or a tip of the ground pattern.

14. The apparatus of claim 10, wherein the at least one processor is further configured to:
    estimate a vehicle motion parameter based on data obtained from one or more vehicle motion sensors; and generate the output signal to perform calibration of installation parameters of the at least one image sensor based on the estimated vehicle motion parameter.

15. The apparatus of claim 14, wherein the one or more vehicle motion sensors comprise at least one of: a steering angle sensor, a wheel speed sensor, or an inertial measurement unit (IMU).

16. The apparatus of claim 15, wherein the vehicle motion parameter comprises at least a vehicle speed parameter.

17. A non-transitory computer-readable medium having stored thereon computer-executable instructions which when executed by at least one processor, cause the at least one processor to conduct operations for detecting a calibration requirement for at least one image sensor, the operations comprising:
  detecting a ground pattern in a generated image associated with a surrounding of a vehicle;
  extracting at least one key point associated with the detected ground pattern, from the generated image;
  determining a relative motion parameter associated with the extracted at least one key point based on tracking of the extracted at least one key point over a period of time, further comprising:
    detect a first location of the at least one key point at a first-time instance in the period of time;
    detect a second location of the at least one key point at a second time instance in the period of time;
    generate a line extending between the first location and the second location; and
    determine the relative motion parameter associated with the extracted at least one key point based on an orientation of the generated line with respect to the vehicle's body;
  detecting calibration requirement for the at least one image sensor based on determined relative motion parameter; and
  generating an output signal based on the detected calibration requirement.

18. The non-transitory computer-readable medium of claim 17, wherein to detect the calibration requirement for the at least one image sensor based on the determined relative motion parameter, the operations further comprise:
  detecting the calibration requirement as a positive calibration requirement indicative of a need for calibrating one or more installation parameters of the at least one image sensor when the relative motion parameter indicates a straight line parallel to the vehicle's body; and
  detecting the calibration requirement as a negative calibration requirement indicative of no need for calibrating one or more installation parameters of the at least one image sensor when the relative motion parameter indicates at least one of a non-straight line or a non-parallel line to the vehicle's body.

19. The non-transitory computer-readable medium of claim 18, wherein the operations further comprise:
  generating the output signal to trigger a re-calibration algorithm when the positive calibration requirement is detected.

20. The non-transitory computer-readable medium of claim 17, wherein the operations further comprise:
  estimating a vehicle motion parameter based on data obtained from one or more vehicle motion sensors; and
  generating the output signal to perform calibration of installation parameters of the at least one image sensor based on the estimated vehicle motion parameter.

* * * * *